United States Patent
Njegovan et al.

(10) Patent No.: US 8,398,454 B2
(45) Date of Patent: Mar. 19, 2013

(54) APPARATUS FOR TESTING THE POLISHABILITY OF MATERIALS

(75) Inventors: Nikola Njegovan, Chicago, IL (US);
Spiro Megremis, Chicago, IL (US);
Olga Sirovskaya, Dublin, CA (US);
Hank Shepelak, Lisle, IL (US)

(73) Assignee: American Dental Association, Chicago, IL (US)

( * ) Notice: Subject to any disclaimer, the term of this patent is extended or adjusted under 35 U.S.C. 154(b) by 740 days.

(21) Appl. No.: 12/571,077

(22) Filed: Sep. 30, 2009

(65) Prior Publication Data
US 2010/0081362 A1  Apr. 1, 2010

Related U.S. Application Data

(60) Provisional application No. 61/101,320, filed on Sep. 30, 2008.

(51) Int. Cl.
*B24B 49/00* (2012.01)
*B24B 51/00* (2006.01)

(52) U.S. Cl. .................. 451/5; 451/6; 451/8; 451/67

(58) Field of Classification Search ............ 73/105; 451/5, 6, 8, 287, 65, 66, 67
See application file for complete search history.

(56) References Cited

U.S. PATENT DOCUMENTS

| | | | |
|---|---|---|---|
| 4,029,632 A | 6/1977 | Gross et al. | |
| 5,105,552 A | 4/1992 | Bielle | |
| 5,383,752 A | 1/1995 | Rheinberger et al. | |
| 5,990,195 A | 11/1999 | Arita | |
| 6,334,773 B1 * | 1/2002 | Ahlen et al. | 433/29 |
| 7,556,460 B2 * | 7/2009 | Steger | 409/89 |

FOREIGN PATENT DOCUMENTS
EP  1 834 602 A1  9/2007

OTHER PUBLICATIONS

International Search Report and Written Opinion from PCT/US2009/059094 dated Nov. 25, 2009.
ANSI/ADA Specification 27, "Resin-Based Filling Materials," Jul. 16, 1993.
ISO/DIS 4049 "Dentistry—Polymer-based restorative materials," 2008.
ISO "Dentistry—Powered Polymerization Activators" ISO 10650-1:2004(E).
C. S. Jones, R. W. Billington, and G. J. Pearson, "Laboratory study of the loads, speeds and times to finish and polish direct restorative materials," Journal of Oral Rehabilitation, 2005 32: 686-692.
C. S. Jones, R. W. Billington, and G. J. Pearson, "The in vivo perception of roughness of restorations," British Dental Journal, vol. 196, No. 1, Jan. 10, 2004 42-45.

(Continued)

*Primary Examiner* — Timothy V Eley
(74) *Attorney, Agent, or Firm* — Banner & Witcoff, Ltd.

(57) ABSTRACT

A method and apparatus for measuring the polishability of a solid material such as a dental restorative material includes using a series of apparatus to perform the steps of forming the material into a desired specimen with a generally planar surface, conditioning the surface by abrasion, measuring the abraded surface with a profile determination device, optionally measuring the amount of material abraded from the surface and the gloss of the abraded surface, polishing a portion of the abraded surface with a polishing device at a controlled load for a pre-determined time and measuring the roughness and/or gloss of the polished surface followed by comparison thereof to the corresponding measurements of the unpolished, conditioned portion of the specimen surface. Polishing materials and devices may also be tested using the apparatus and method for polishing a standardized material.

10 Claims, 24 Drawing Sheets

OTHER PUBLICATIONS

Juliana Da Costa, Jack Ferracane, Rade Paravina, Rui Fernando Mazur, and Leslie Roeder, "The Effect of Different Polishing Systems on Surface Roughness and Gloss of Various Resin Composites," Journal of Esthetic Restorative Dentistry, 19:214-226, 2007.

Tamayo Watanabe, Masashi Miyazaki, and B. Keith Moore, "Influence of polishing instruments on the surface texture of resin composites," Quintessence International, Jan. 2006 vol. 37, No. 1: 61-67.

ASTM D 523—89, "Standard Test Method for Specular Gloss." Annual Book of ASTM Standards, vol. 6.01, "Paint—Tests for Chemical, Physical, and Optical Properties; Appearance" (Reapproved 1999).

ASTM D 3980-88, "Standard Practice for Interlaboratory Testing of Paint and Related Materials." Annual Book of ASTM Standards, vol. 6.01, "Paint—Tests for Chemical, Physical, and Optical Properties; Appearance", 1988.

Quirynen M., Bollen C.M., Papaioannou W., et al., "The influence of titanium abutment surface roughness on plaque accumulation and gingivitis: short-term observations," Int. J. Oral Maxillofac Implants 1996; vol. 11, No. 2:169-178.

* cited by examiner

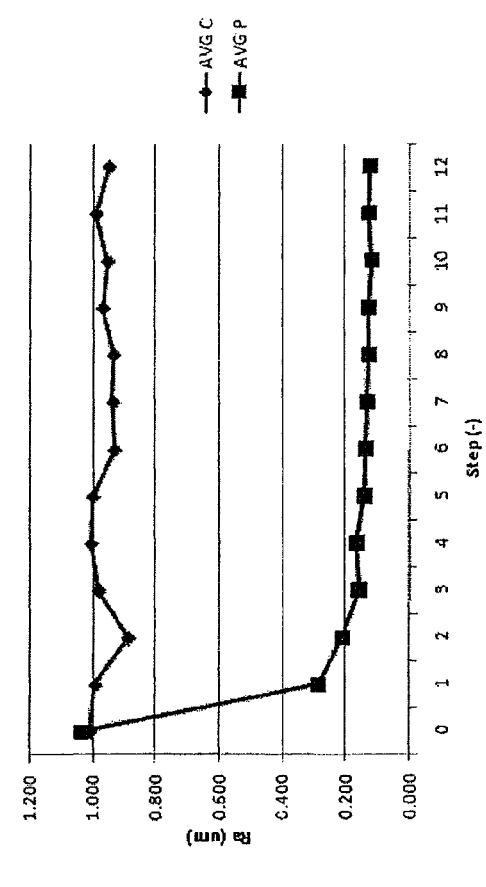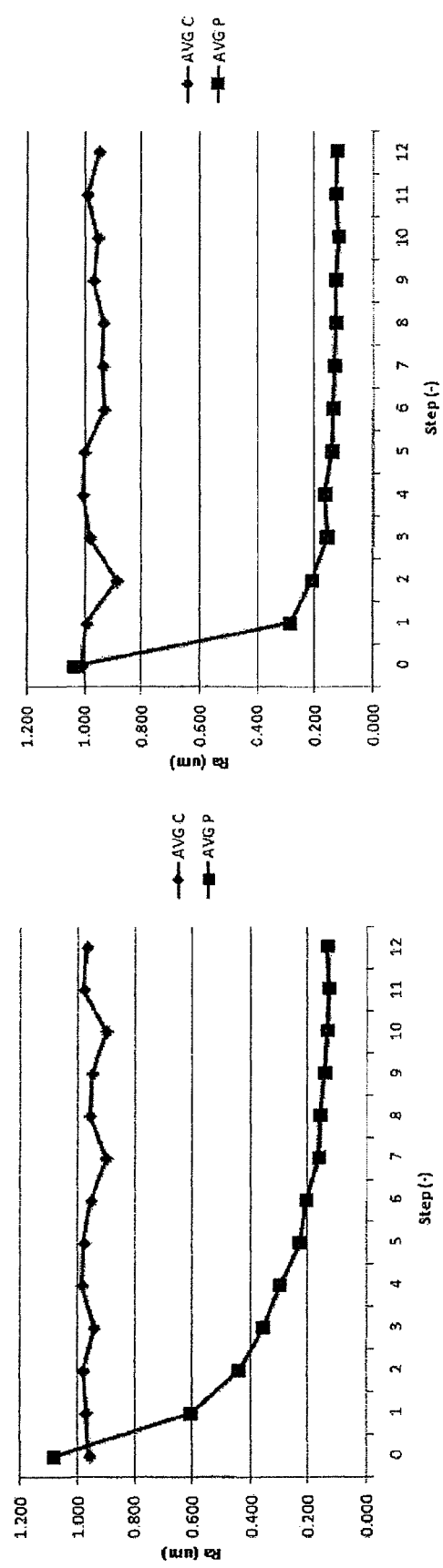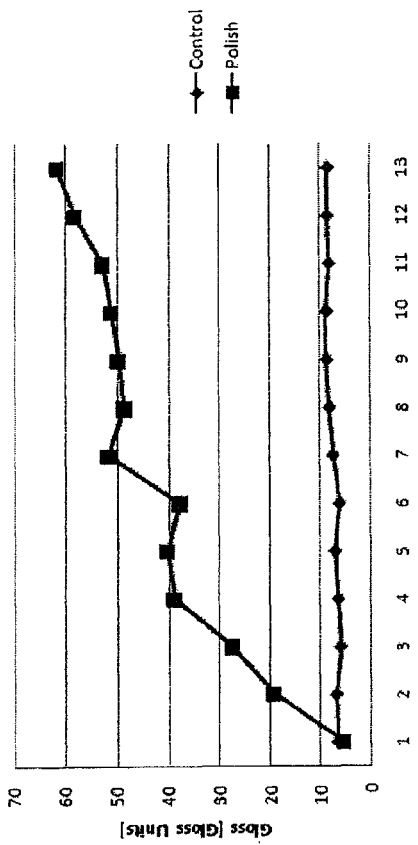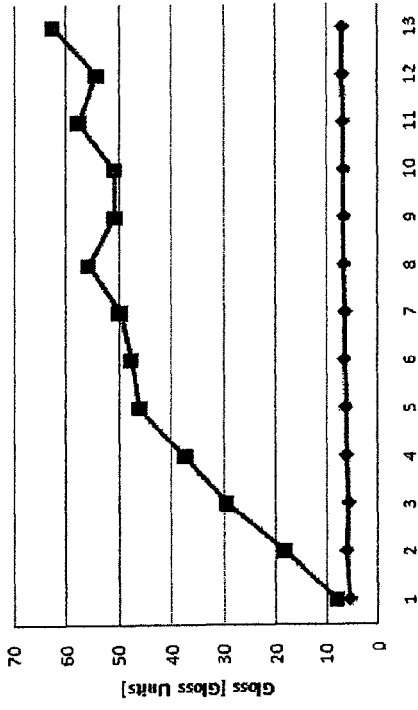
FIGURE 24

APPARATUS FOR TESTING THE POLISHABILITY OF MATERIALS

CROSS REFERENCE TO RELATED APPLICATION

This is a utility patent application based upon, claiming priority to and derived from previously filed provisional application, entitled "Polishing Device Testing Apparatus", Ser. No. 61/101,320 filed Sep. 30, 2008 which is incorporated herein by reference.

BACKGROUND OF THE INVENTION

In a principal aspect, the present invention relates to the design and use of a system and methods directed to evaluation of the polishability of materials and/or the performance of polishing devices and/or instruments in a standard, repeatable manner.

There are various clinical and laboratory evaluations reporting on the polishability of materials (such as dental repair materials) and the performance of polishing devices and/or instruments (such as dental devices); however, the evaluations rely heavily on human intervention to control several important test parameters, such as applied force, contact distance and duration, and movement of the polishing equipment in contact with the material being polished by the clinician. Furthermore, the laboratory evaluations typically lack proper feedback control mechanisms to maintain these test variables in a dynamic testing environment. Thus, there is a need for apparatus that properly control such variables. The described system and method provide a precise and repeatable means for evaluating the polishability of materials and/or the performance of polishing devices and/or instruments.

SUMMARY OF THE INVENTION

The system and methods utilize the following elements: a) initial surface finish preparation apparatus; b) surface roughness measurement apparatus; c) height measurement apparatus; d) gloss measurement apparatus; e) polishing device testing apparatus; and f) communication, control, and data processing software.

A. Initial Surface Finish Preparation Apparatus

This apparatus allows a user to prepare an initial, uniform surface finish to the material to be tested. The apparatus is comprised of a rotating turntable with abrasive paper mounted to it. Various mounting hardware is used to position the face of the sample material parallel with the face of the rotating turntable. The apparatus includes a motorized chucking device to allow the sample to be rotated independently of the rotating turntable, and a linear, motorized translation stage to move the rotating sample into contact with the rotating turntable. The apparatus is also comprised of a software program to control the movement and timing of the translation stage. This apparatus is depicted in FIGS. 1-6 of the drawing.

B. Surface Roughness Measurement Apparatus

This apparatus allows a user to measure and record roughness values on multiple portions of a test specimen during the testing procedure. The apparatus includes a mounting device that allows the test specimen to be positioned beneath a surface profilometer with accuracy and repeatability. The precision mounting device also allows a test specimen to be mounted such that the plane corresponding to the face of the test specimen is parallel with the measurement path of the chisel of the profilometer. The base of the profilometer is typically mounted on a motorized, three-axis positioning stage, and the apparatus includes a lifting arm attached to a linear stage that may be able to be raised and lowered in response to a computer-controlled, linear actuator. The lifting arm allows the measuring chisel of the profilometer to come into contact with the face of the test specimen and then be raised at the conclusion of a measurement. The apparatus also is typically operated in accord with a software program to control the movement of the motorized stages, the movement of the lifting arm, and collection of the profilometer readings. FIGS. 7-11 of the drawing depict an embodiment of the apparatus.

C. Height Measurement Apparatus

This apparatus enables a user to measure changes in the amount of material removed from the surface of a test specimen during the testing procedure. The apparatus includes a mounting device that allows the specimen to be positioned in the center of a motorized rotation stage with accuracy and repeatability. The apparatus is comprised of an electronic height indicator mounted on a two-axis positioning table (this positioning table may be computer controlled). The electronic height indicator is mounted on the two-axis positioning table such that its measurement axis is perpendicular to the plane of the two-axis table. The indicating rod of the electronic height indicator may be raised and lowered from and to the surface of the test specimen, respectively, by a computer-controlled, linear actuator. The apparatus typically operates in accord with a software program to control the movement of the stage, the movement of the electronic height indicator, and collect the height measurement readings. FIGS. 12-14 of the drawing depict an embodiment of the apparatus.

D. Gloss Measurement Apparatus

This apparatus enables a user to measure changes in gloss on the surface of the test specimen during the testing procedure. The apparatus includes a mounting device that allows the specimen to be positioned over the aperture of a glossmeter with accuracy and repeatability. The mounting device is typically secured to a vertical slide (can be computer-controlled) that allows the face of the specimen to be lowered onto the face of the glossmeter over its aperture. The vertical slide is mounted to a horizontal slide (can be computer-controlled) such that the face of the specimen can be moved parallel to the face of the glossmeter. FIG. 15 of the drawing depicts an embodiment of the apparatus.

E. Polishing Device Testing Apparatus

This apparatus enables application of a constant, programmed load by a polishing instrument or tool to a test specimen while the tool is moved in a programmed manner. The apparatus includes a mounting device that allows the test specimen to be mounted to it with accuracy and repeatability. This mounting device allows the specimen to be removed from the apparatus and then precisely remounted when required without losing the original position setting. The test specimen is mounted upon a force sensing holder or mount that accurately reports force applied to the specimen. The precision mount is attached to a vertical slide that is controlled by a motor which can move the specimen into the pathway of a polishing instrument. Power to the motor is controlled by a microprocessor and associated electronic hardware and software. The apparatus allows a predetermined load to be set programmatically at any time and maintained in accord with software in the processor. A clamp holds a polishing device and/or tool and/or instrument over the surface of the test specimen. The clamp is affixed to a manual rotation table. The rotation table may be motorized to enable the position of the device and/or instrument to be computer-controlled. Once the specimen contacts the polishing device and/or instrument, the motorized positioning table has the ability to move the specimen beneath the polishing device and/or instrument for a pre-programmed time, distance, pattern and speed while the computer-controlled motor maintains the load on the specimen at the programmed setting. FIGS. 16-19 of the drawing depict an embodiment of this apparatus.

F. Communication, Control and Data Processing Software

The five described machines or devices may be mounted together as a test station or mounted separately. In combination, they comprise a system which accurately and with repeatability provides test data enabling the establishment of methods for evaluating performance of materials such as dental restoratives and for comparison testing the efficacy and utility of polishing materials and devices.

In practice, specimens in the form of a disk or cylinder with a generally planar face transverse to the axis of the disk or cylinder are used in the conduct of the protocols associated with the devices described (see FIGS. 20A and 20B). The disk is then processed to establish quantitative measurements of polishability in accord with the general flow diagram of FIG. 21 using the described apparatus. The resultant data is highly repeatable and thus highly desired to, for example, establish or verify standards in a relevant field. Additionally, the apparatus may be utilized to quantify polishing tool or instrument data to thereby establish utility and efficacy for purposes, for example, of comparison with standardized data.

The system thus includes associated software to control motion components (motors and actuators) within the system. The software of an embodiment may typically be comprised of the following elements or equivalent controllers: a) An embedded control program, in an embodiment of the invention, developed for an 8051 microprocessor controller, written in C, b) a Graphical User Interface written in G using Active-X Controls to communicate with peripherals, and c) various data processing scripts written in Visual Basic, which parse and organize the data. For example, embedded software in an embodiment of the invention consists of initialization routines including a) Programmable Counter Array Setup, b) Analog to Digital Converter Setup, c) I/O Port Setup, d) System Clock Initialization, and e) Serial Communication Setup. The embedded software written for this system dynamically and automatically controls the force application hardware and is interrupt driven. Thus, it waits for external or internal events to execute certain subroutines upon calling. The interrupt driven routines include a) RS232 communication, b) force control hysteresis, c) programmed force update routine, and d) analog to digital conversion of the force sensor signal. Associated software was written in the G programming language and utilizes Active-X controls to actuate the motion components of the system including all linear actuators, rotation stages, and linear stages. The G program also communicates with the microprocessor to set the programmed force, start/stop the force application, and call for the current programmed force for troubleshooting the software. The G program also provides a graphical user interface for a user to interact with the system and set testing specifications such as contact time, contact force, and number of passes. Final output for the roughness measurement component is processed with numerous scripts written in Visual Basic. A specific flow chart of the operation of the software is shown in FIG. 22, and a concept map is shown in FIG. 23.

Thus, it is an object of the invention to provide an assemblage of testing apparatus which are interrelated in a manner which enables highly accurate assessment of the polishability of materials such as dental materials.

It is a further object of the invention to provide a series of instruments or apparatus which may be utilized independently one from the other yet which, in combination, provide the ability to carefully assess the polishability of materials as well as the efficiency and adequacy and utility of polishing instruments used in a laboratory, clinical, or medical environment such as in the practice of dentistry.

Yet a further object of the invention is to provide a series of interrelated apparatus for polishing and conditioning solid materials to determine the utility and efficacy of such materials as well as to determine the utility and efficacy of instrumentation useful in the conditioning of such materials. Further, protocols associated with the interrelationship of the apparatus are disclosed to enable replication of conditions associated with the testing of materials and the polishability thereof.

Another object of the invention is to provide transformational software which in combination with apparatus enables the preparation of samples for testing of polishability thereof and accurate and repeatable quantitative analysis of polishability and other parameters associated with such materials.

These and other objects, advantages and features of the invention are set forth in the detailed description which follows.

BRIEF DESCRIPTION OF THE DRAWING

In the detailed description which follows reference will be made to the drawing comprised of the following figures:

FIG. 24 is a series of graphs depicting typical test results from the conduct of the protocols associated with the testing apparatus of the invention.

DESCRIPTION OF EMBODIMENTS OF THE INVENTION

Figure 1:
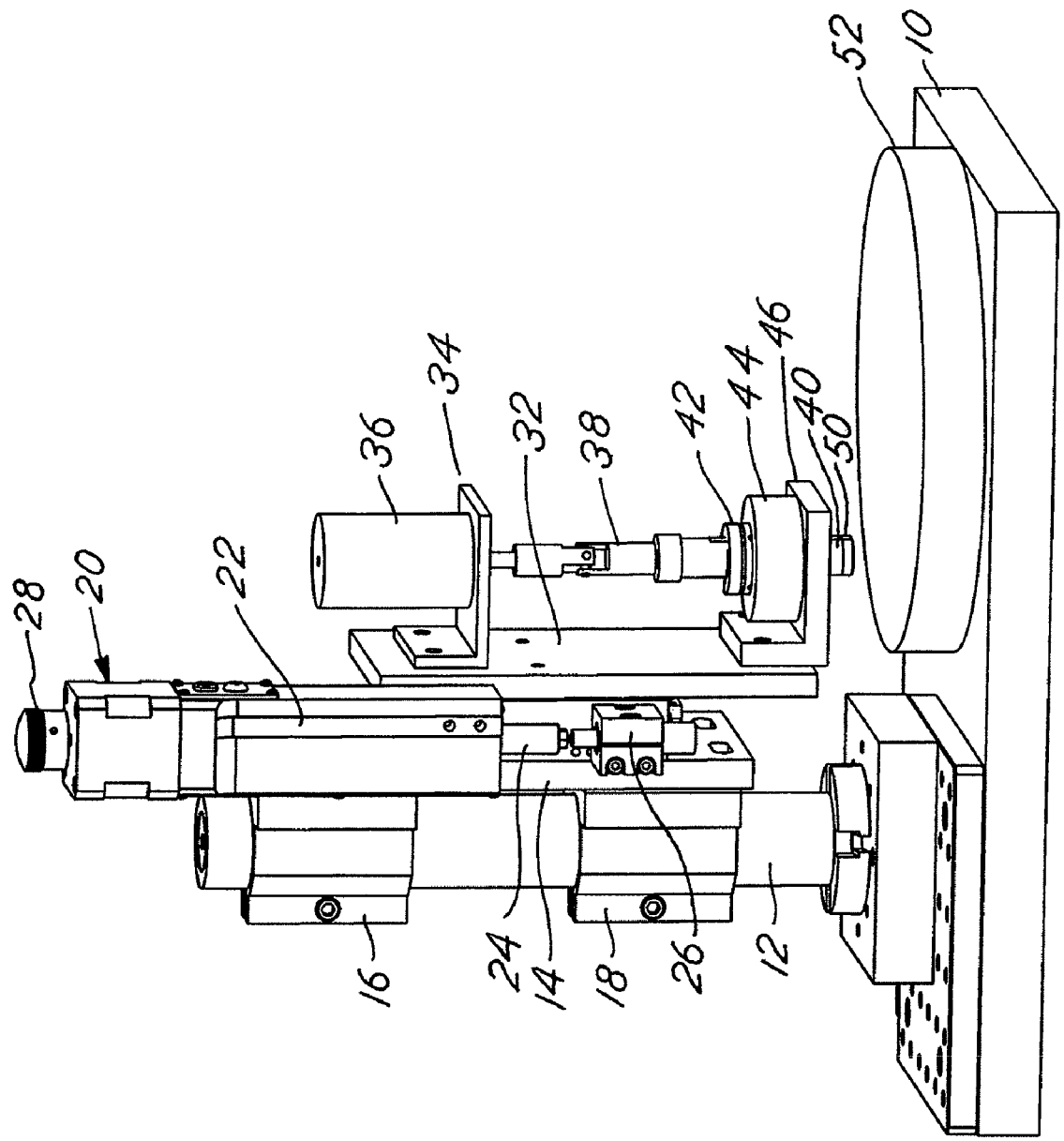
FIG. 1 is a first oblique view of an embodiment of an initial surface finish preparation apparatus.
Figure 2:
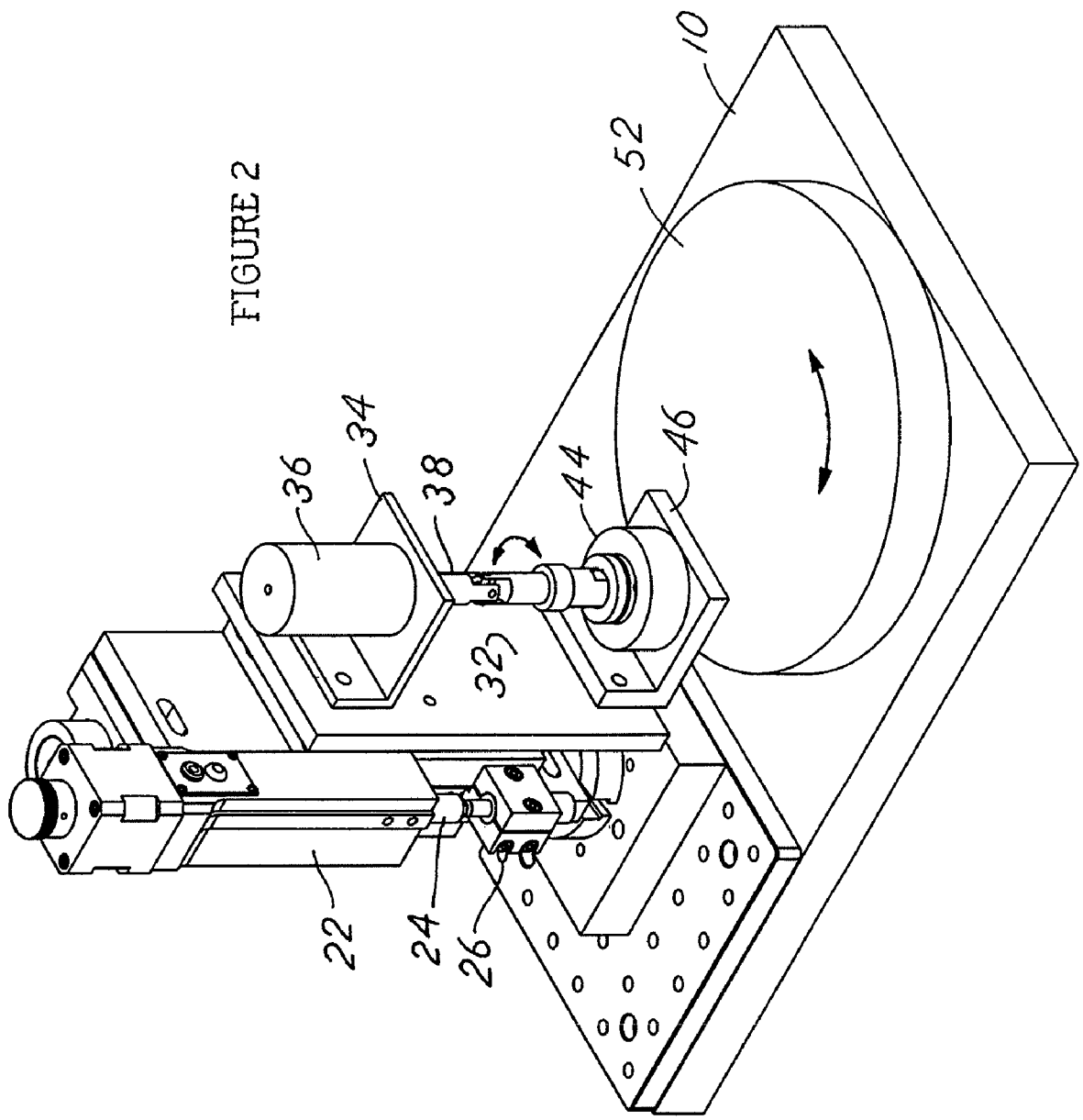
FIG. 2 is an isometric view of the apparatus or device of FIG. 1.
Figure 3:
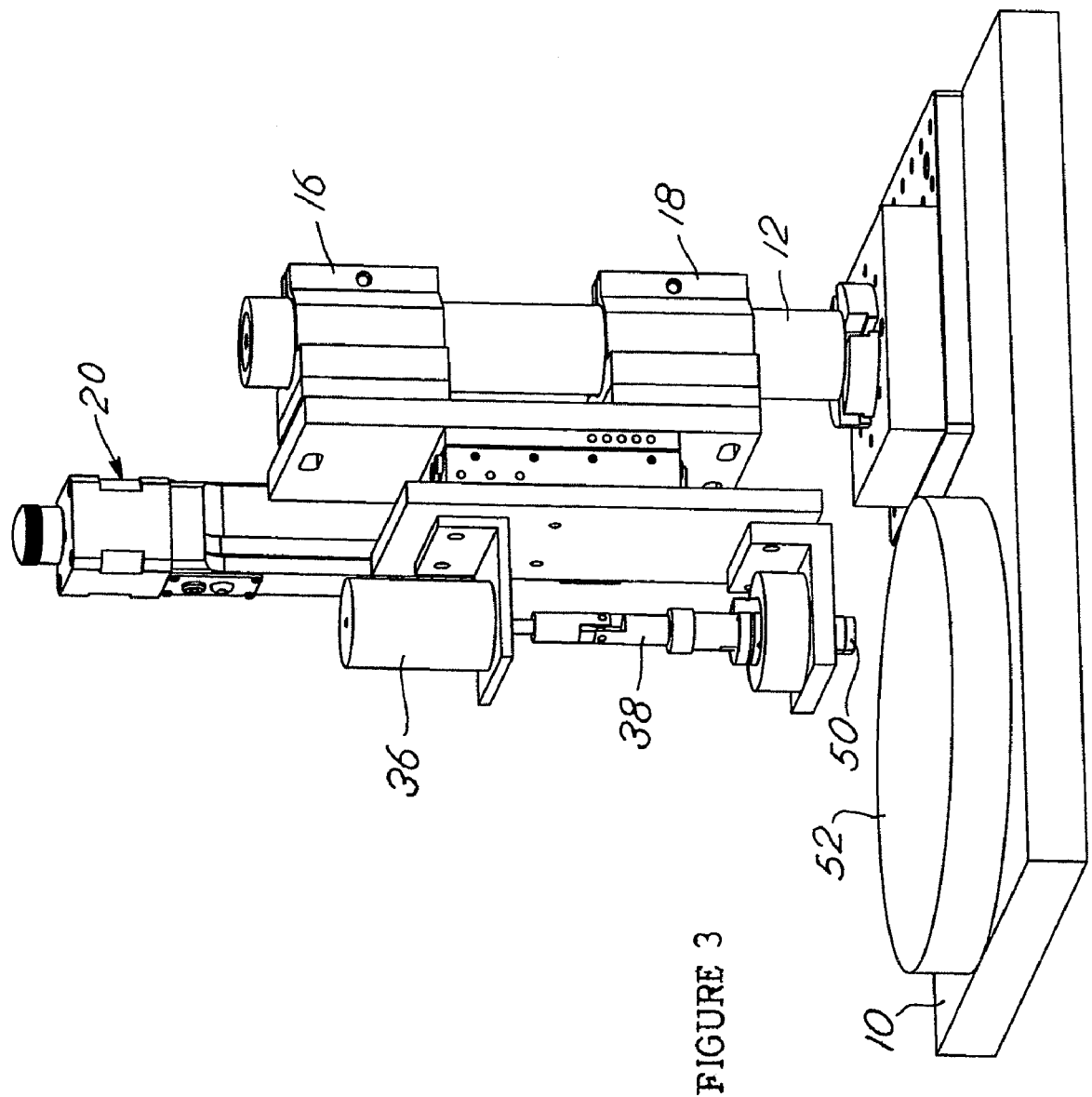
FIG. 3 is a second oblique view of the apparatus of FIG. 1.
Figure 4:
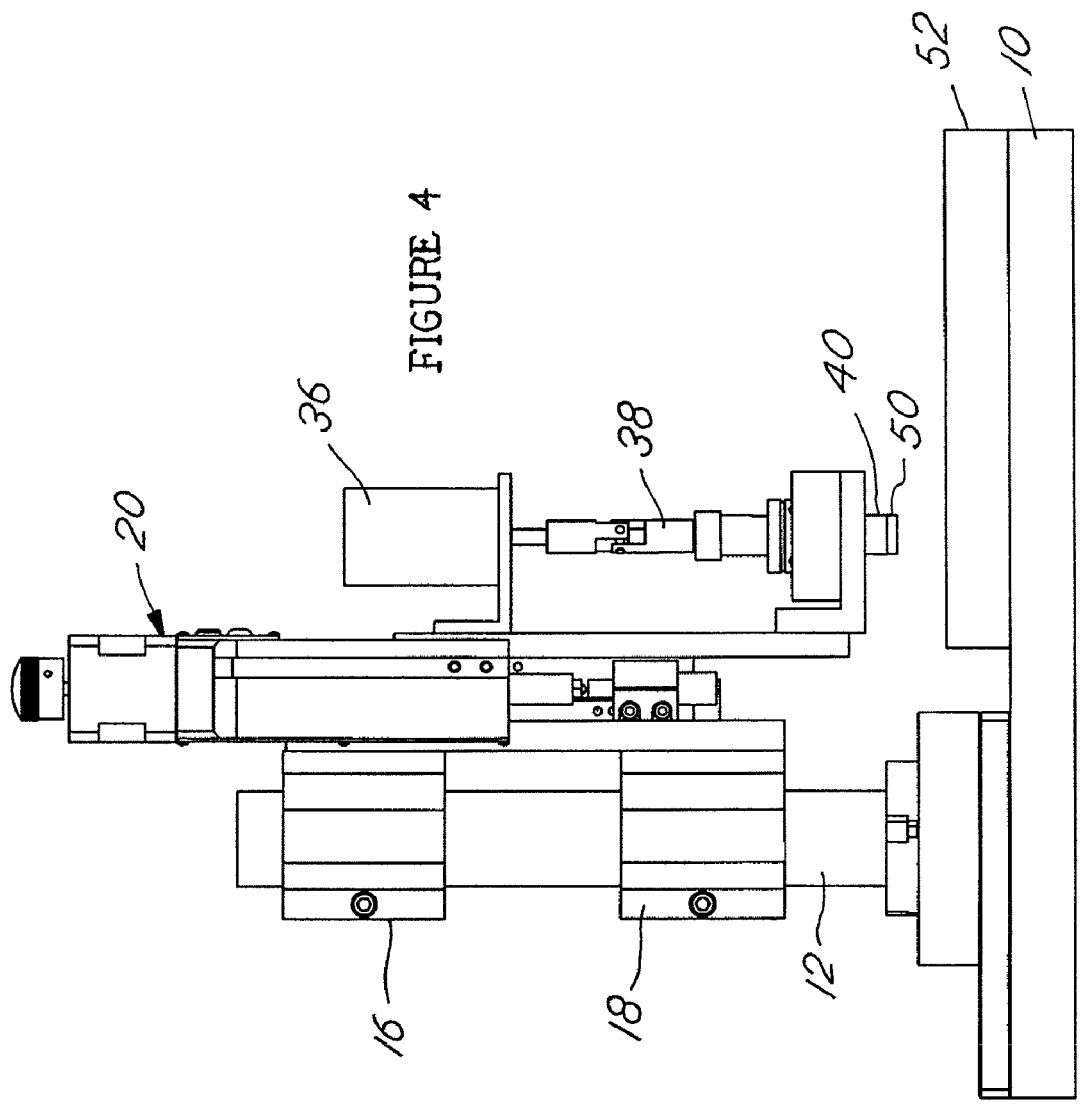
FIG. 4 is a side elevation of the apparatus of FIG. 1.
Figure 5:
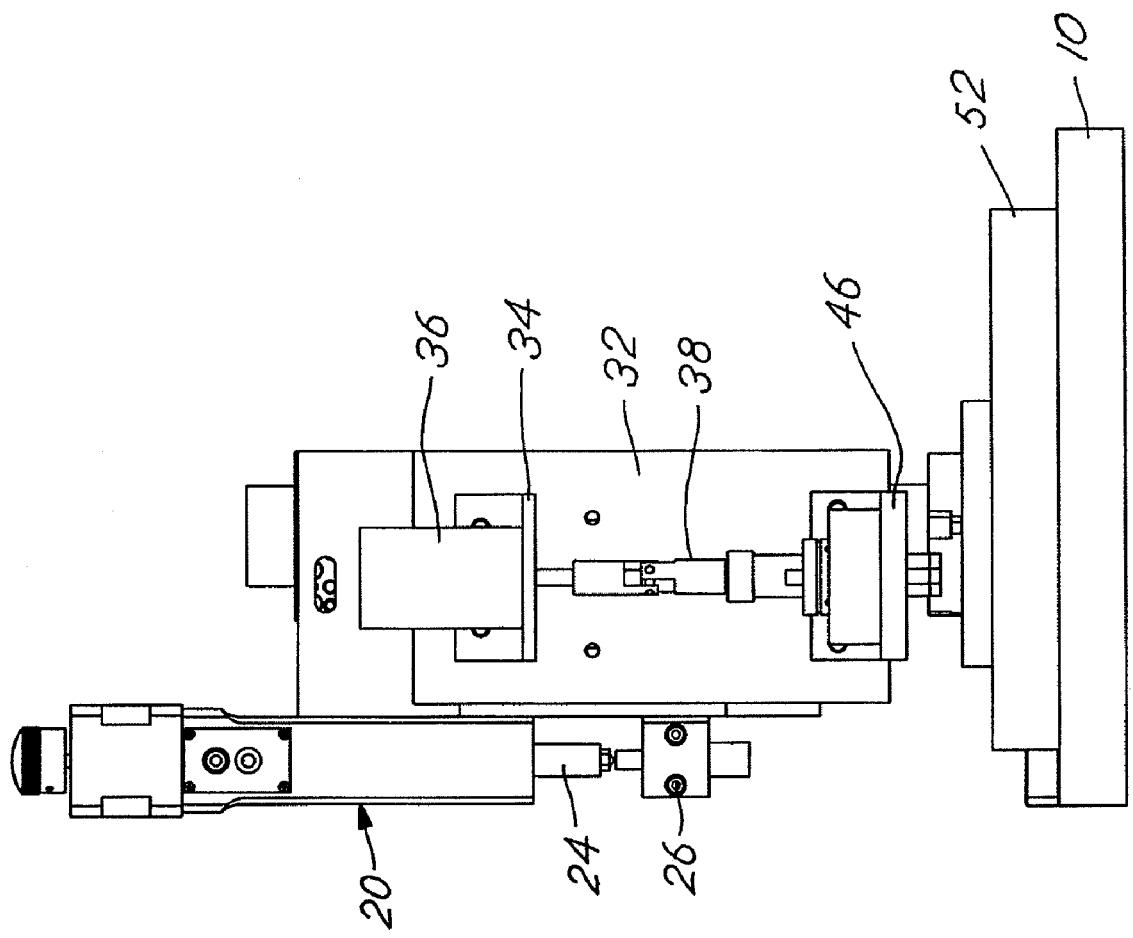
FIG. 5 is a front elevation of the apparatus of FIG. 1.
Figure 6:
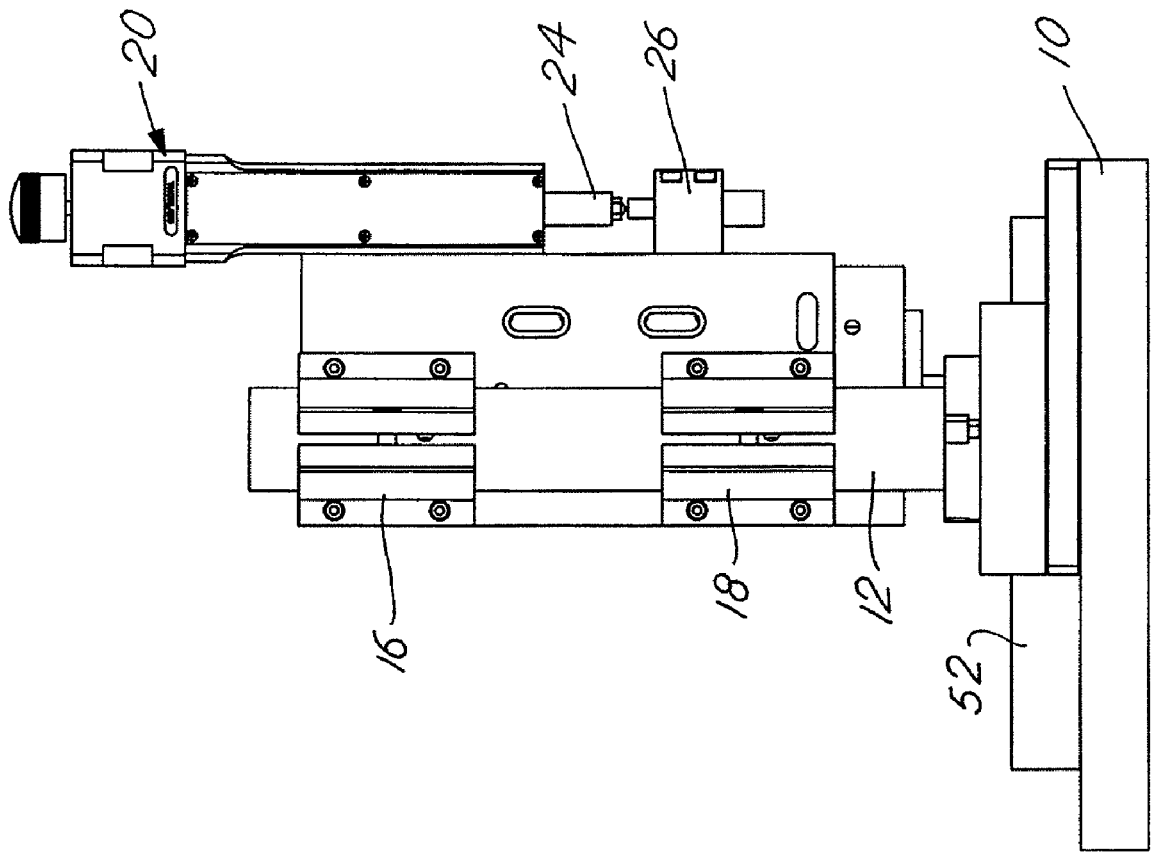
FIG. 6 is an opposite side elevation of the apparatus of FIG. 1 opposite to the view of FIG. 5.
Figure 7:
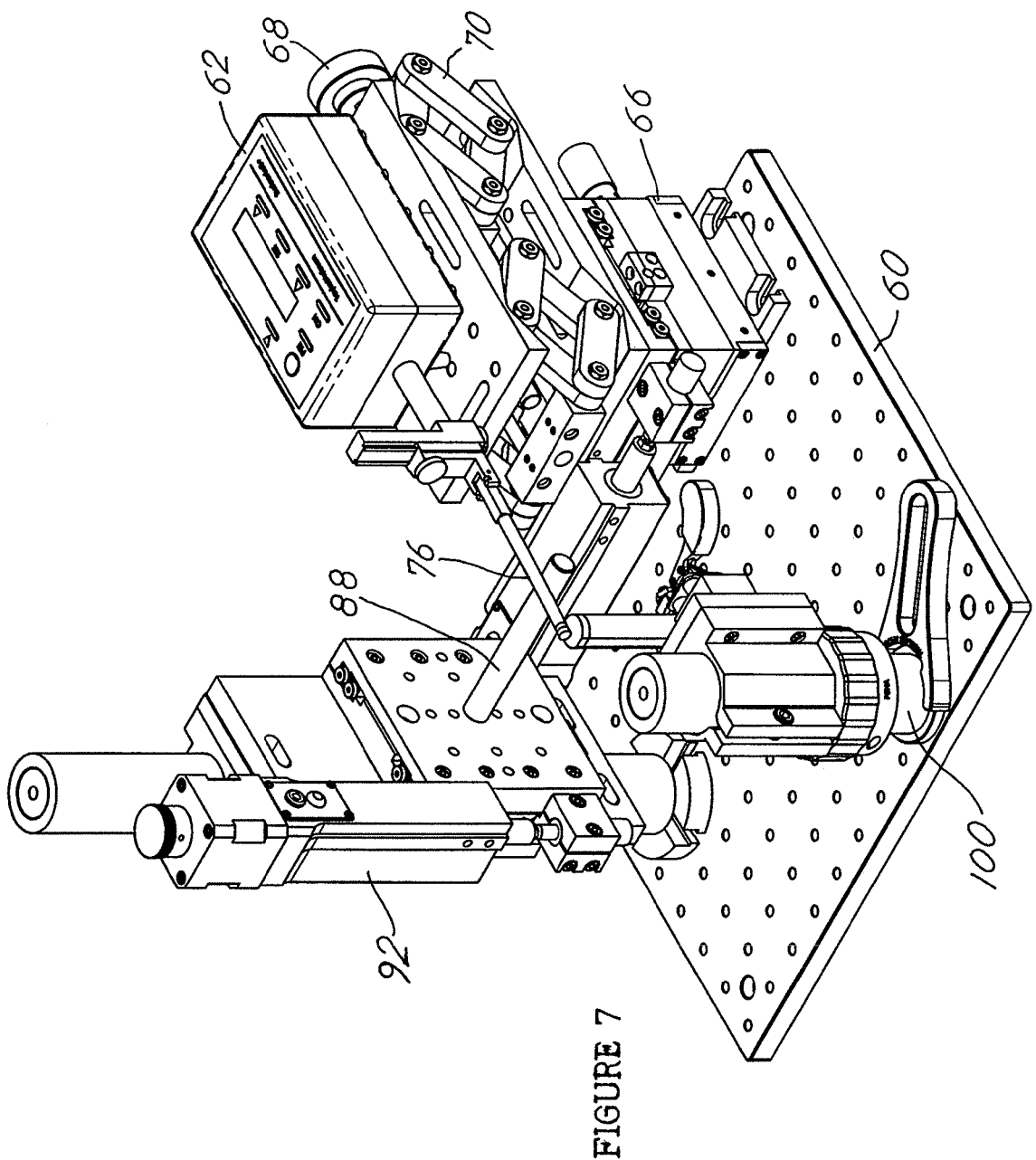
FIG. 7 is an isometric view of a surface roughness measurement apparatus.
Figure 8:
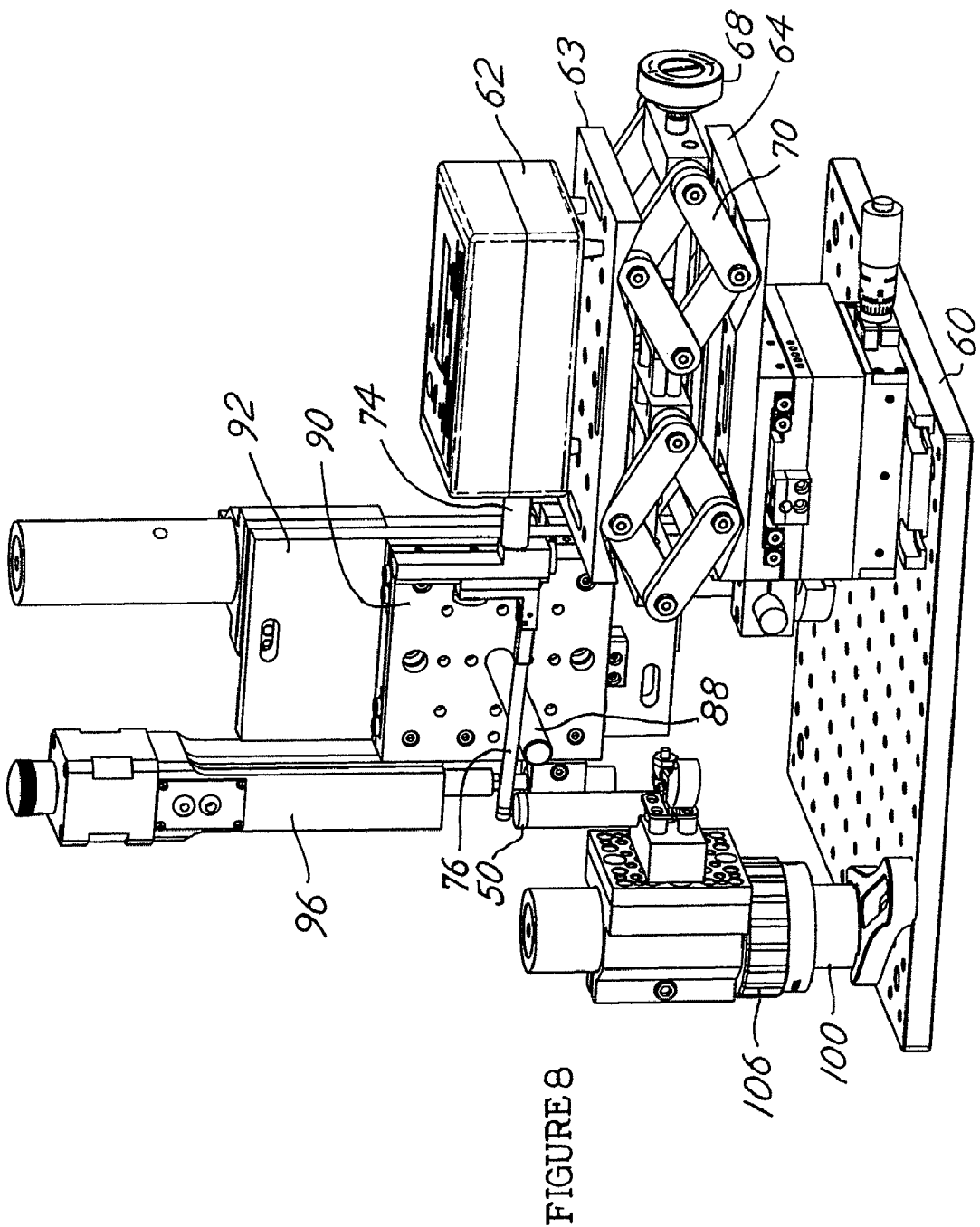
FIG. 8 is another isometric view of the apparatus of FIG. 7.
Figure 9:
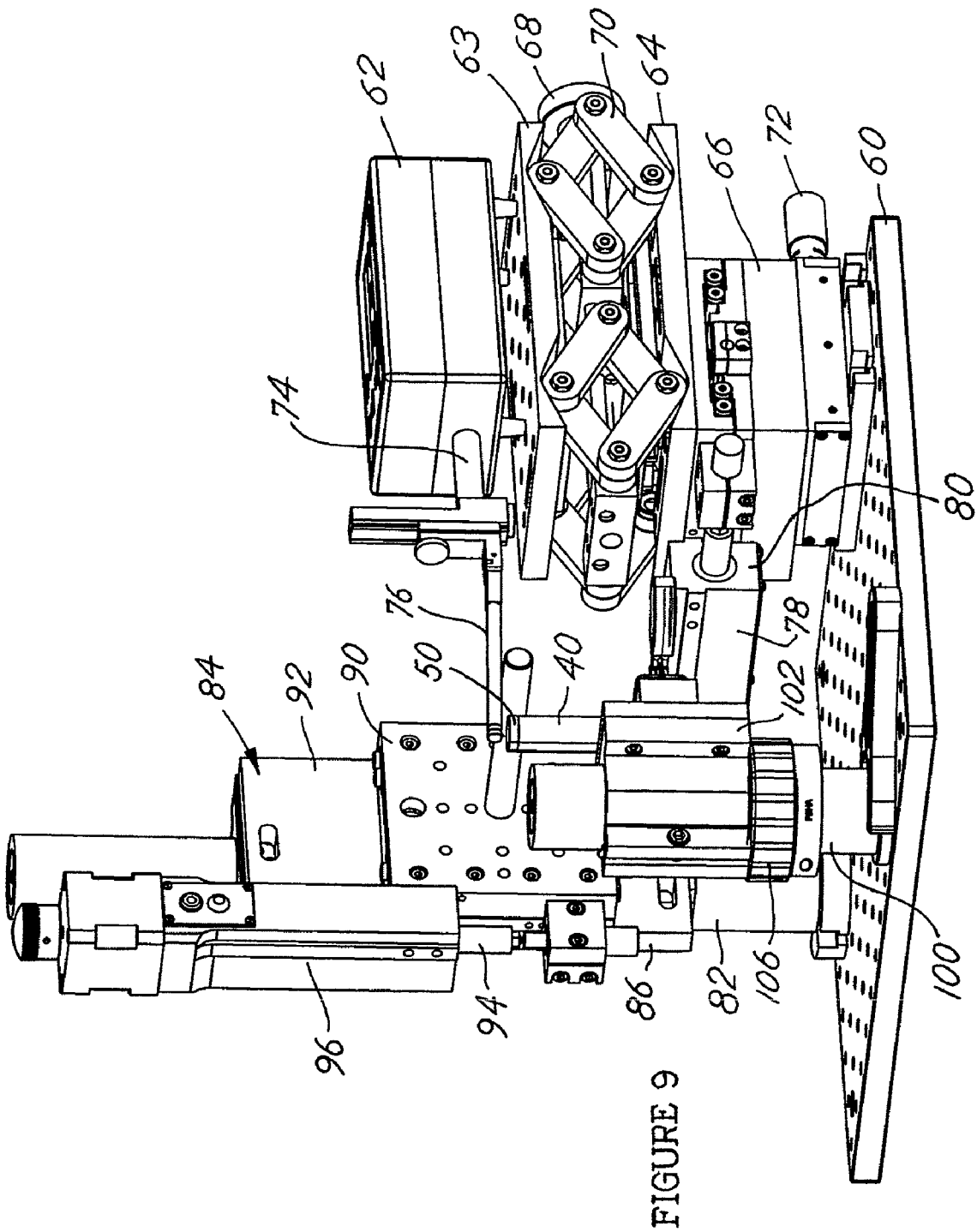
FIG. 9 is a perspective view of the apparatus of FIG. 7.
Figure 10:
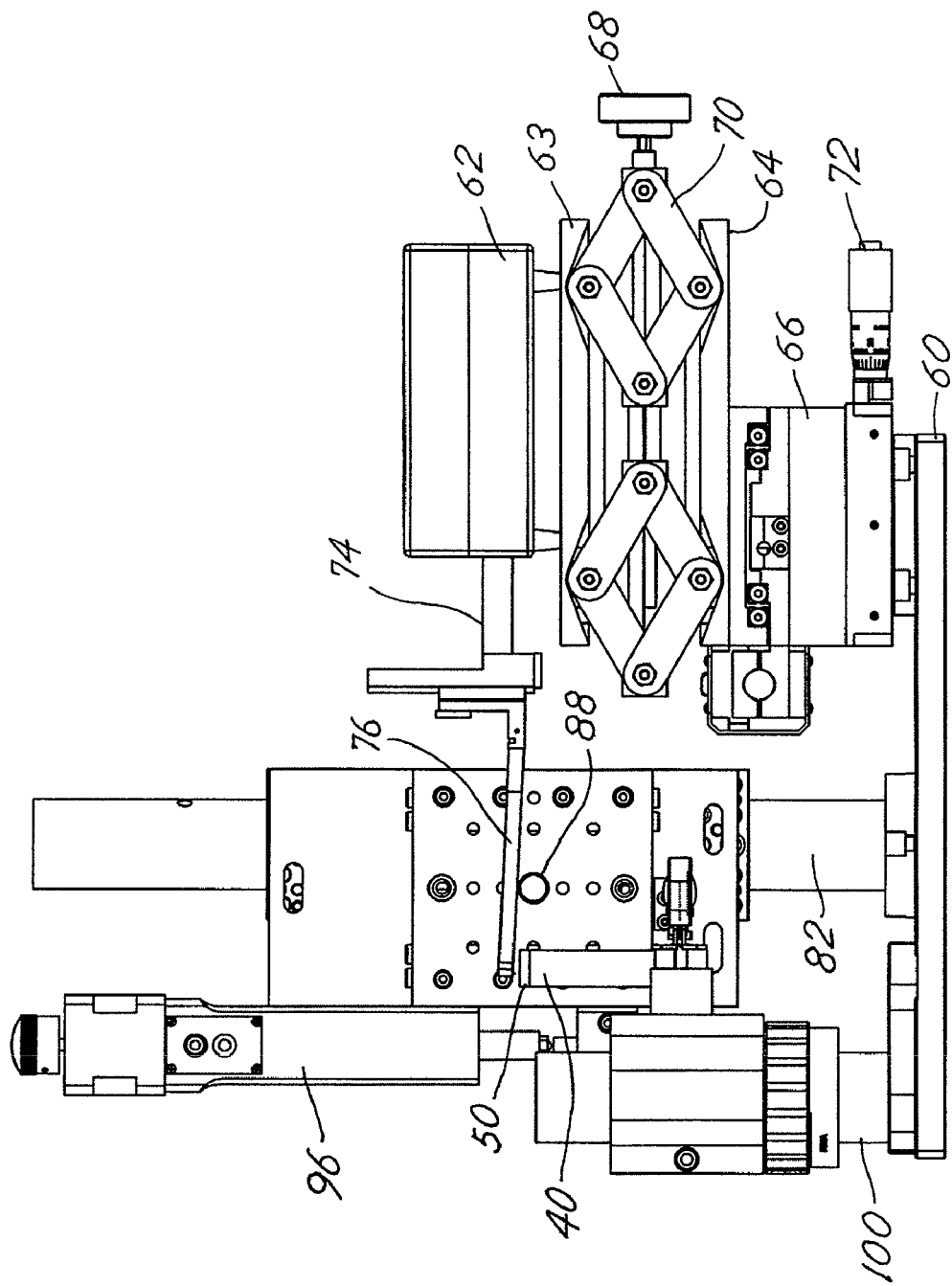
FIG. 10 is a side elevation of the apparatus of FIG. 7.
Figure 11:
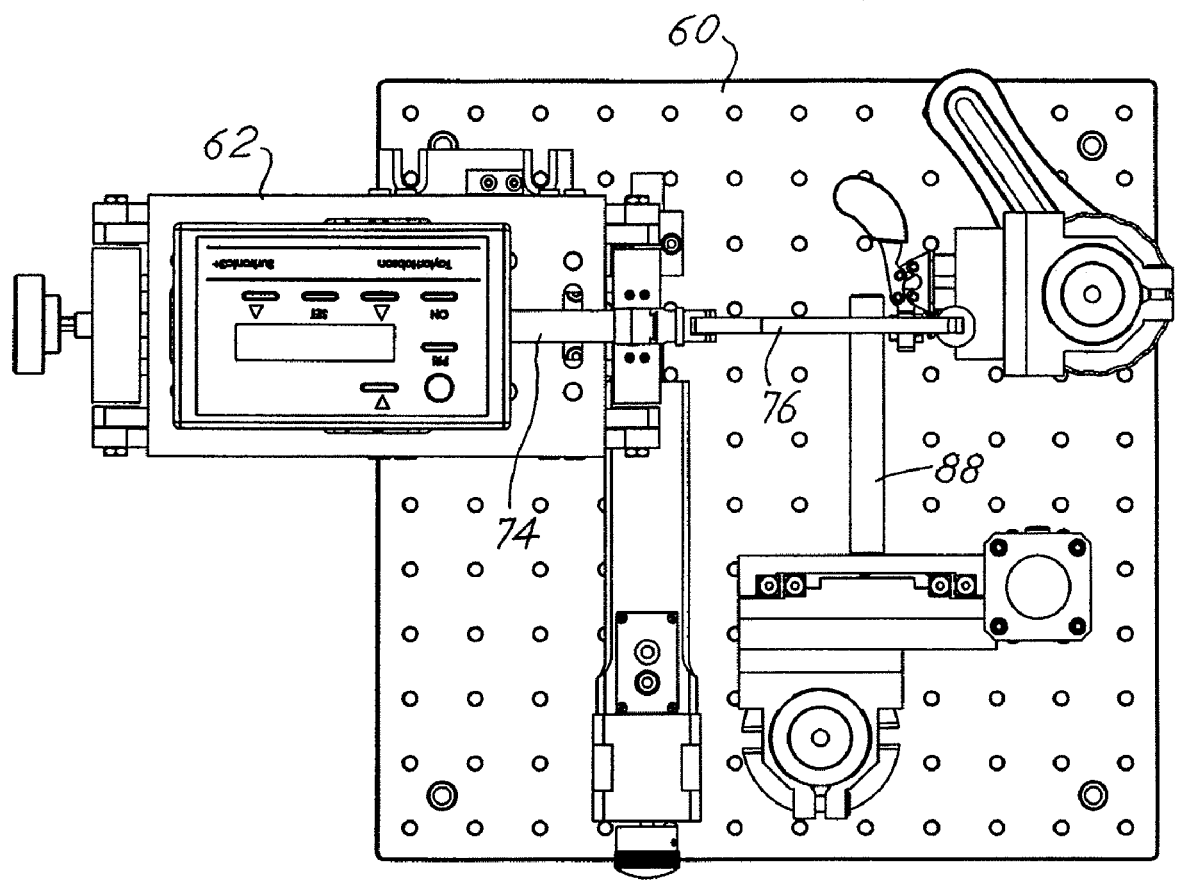
FIG. 11 is a top plan view of the apparatus of FIG. 7.

FIGS. 1-19 comprise embodiments of five separate stations utilized in the practice of the method of the invention and constituting apparatus to enable the practice of multiple steps associated with the collection of data potentially useful for standardizing and uniformly characterizing materials and the polishing of such materials, for example, dental materials or restoratives. By way of example, composite materials such as a combination of silica and bis-GMA including various additives and other formulations desirably will meet certain polishability standards as well as reflective standards and the like. There are currently no specific quantitatively established standards with respect to such materials. The mechanisms and protocols described provide a means to establish such characterizations in a reproducible manner. The various stations or apparatus are described sequentially in the order in which they are typically used. Thus, the first device which is described is an initial surface finish preparation apparatus and is depicted in FIGS. 1-6 of the drawing. This device is used to initially prepare a desired, roughened surface or desired rough surface of a particular material. The device is designed to enable the consistent replication of the uniformity of surface of specific materials, such as dental filler materials referenced above when initially implanted and roughly formed or shaped. Subsequently, modifications to the surface by a tool, such as a dental tool, can be evaluated as described hereinafter.

Subsequent thereto, the roughness of the surface is quantified. This is done using a second station or apparatus which constitutes a surface roughness measurement apparatus as illustrated in FIGS. 7-11.

Figure 12:
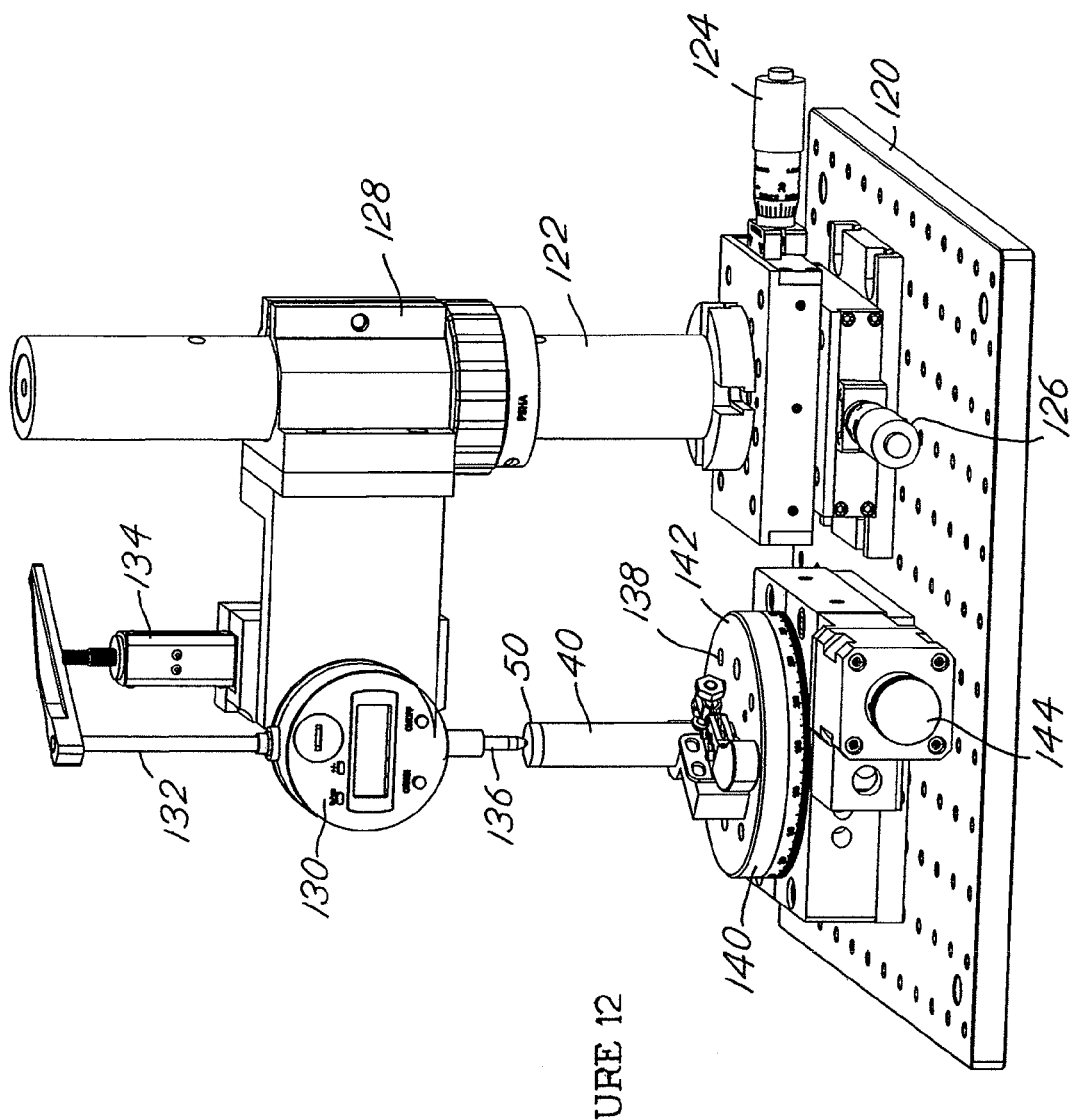
FIG. 12 is an oblique view of a height measurement apparatus comprising an embodiment of the invention.
Figure 13:
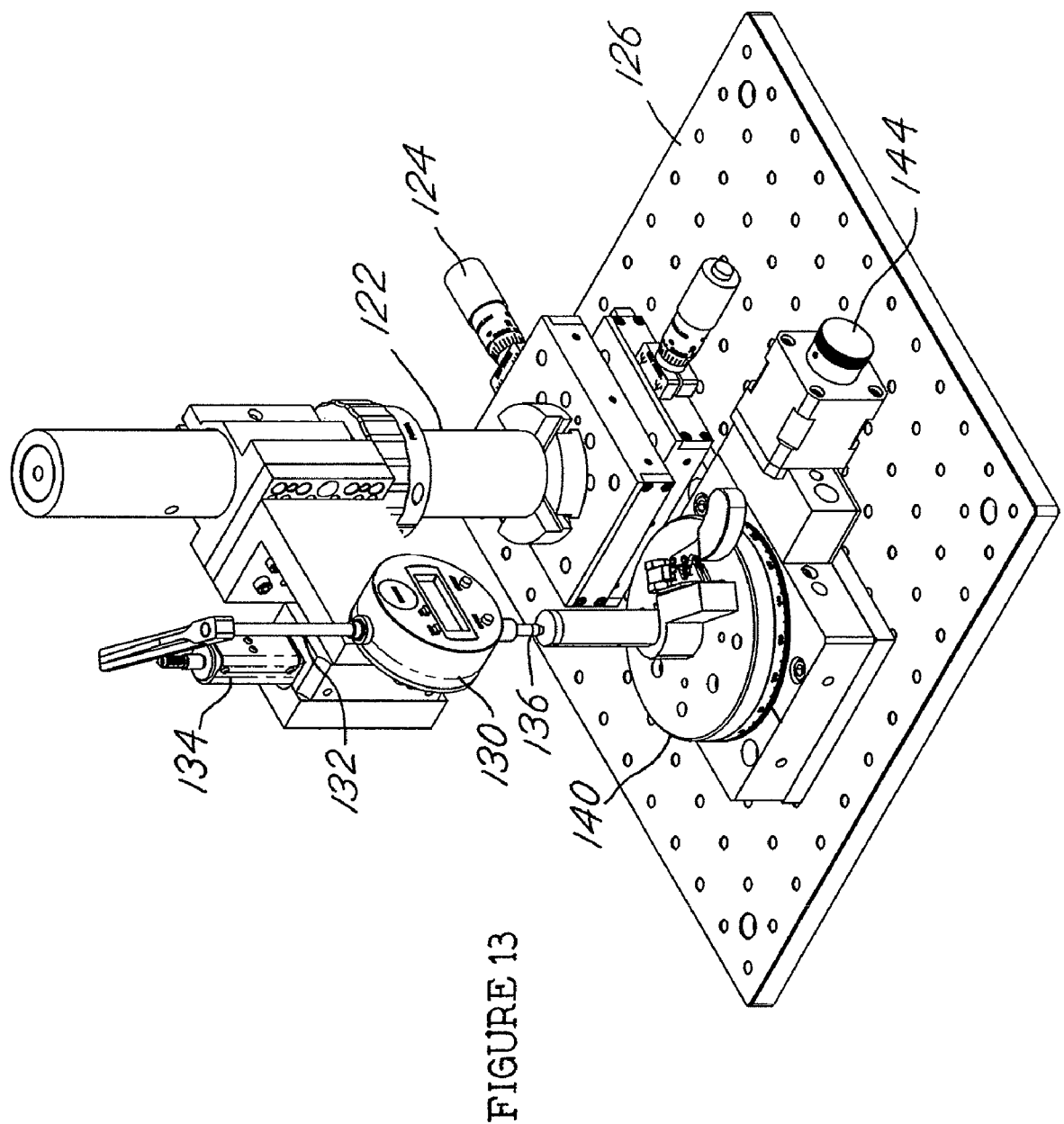
FIG. 13 is an isometric view of the apparatus of FIG. 12.
Figure 14:
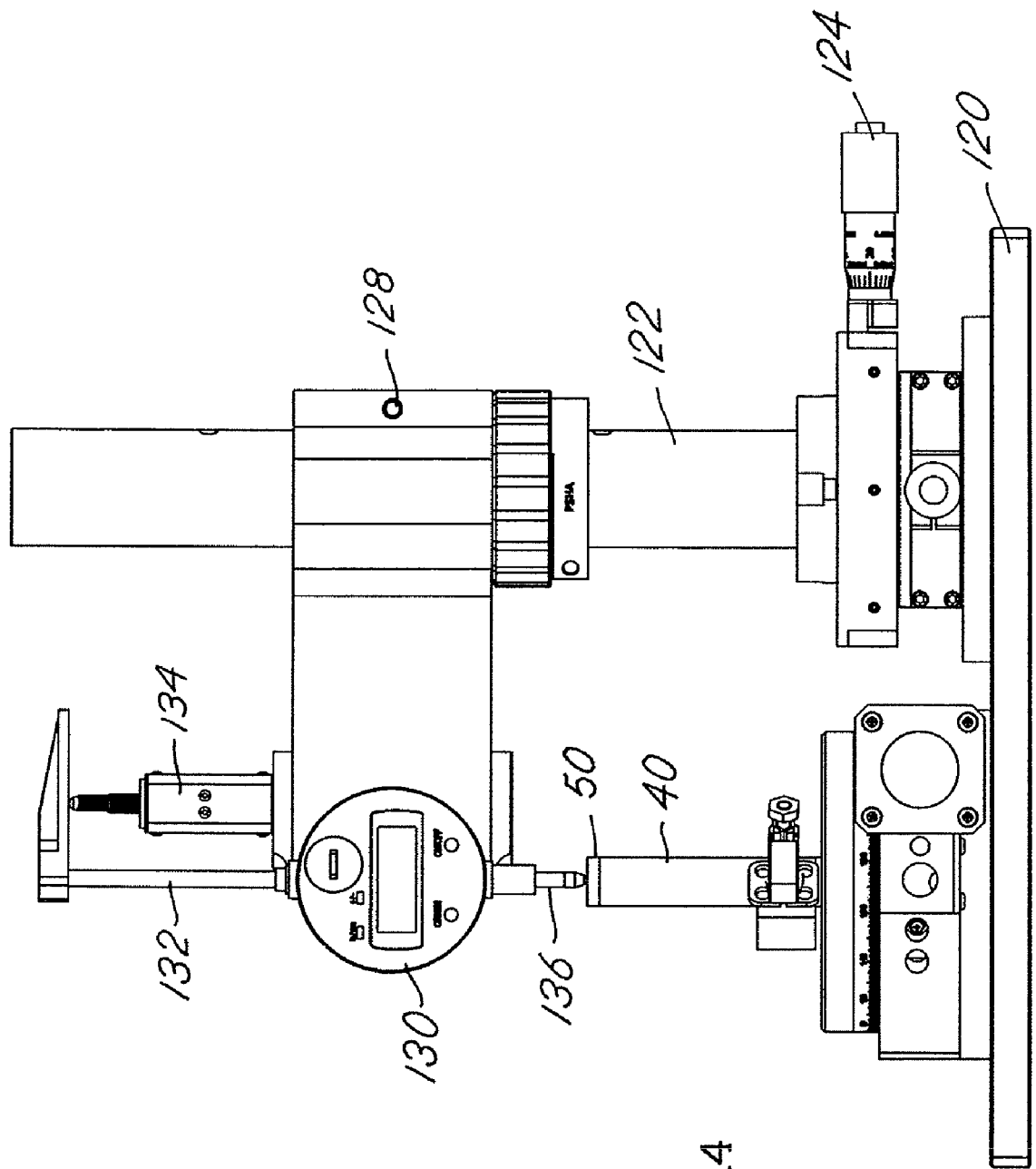
FIG. 14 is a front elevation of the apparatus of FIG. 12.

As a third element in the establishment of the characterization of the material under investigation, a device for determination of the amount of material removed from the surface of a test specimen during any testing procedure is utilized. This particular device may be used at any stage in the processing of the material. It may be used to determine the amount of material removed from the initial test specimen once a base height of the specimen is established as well as the amount removed upon the completion of the series of steps used to characterize the material. This apparatus is identified as a height measurement apparatus and FIGS. 12-14 depict an embodiment thereof.

Figure 15:
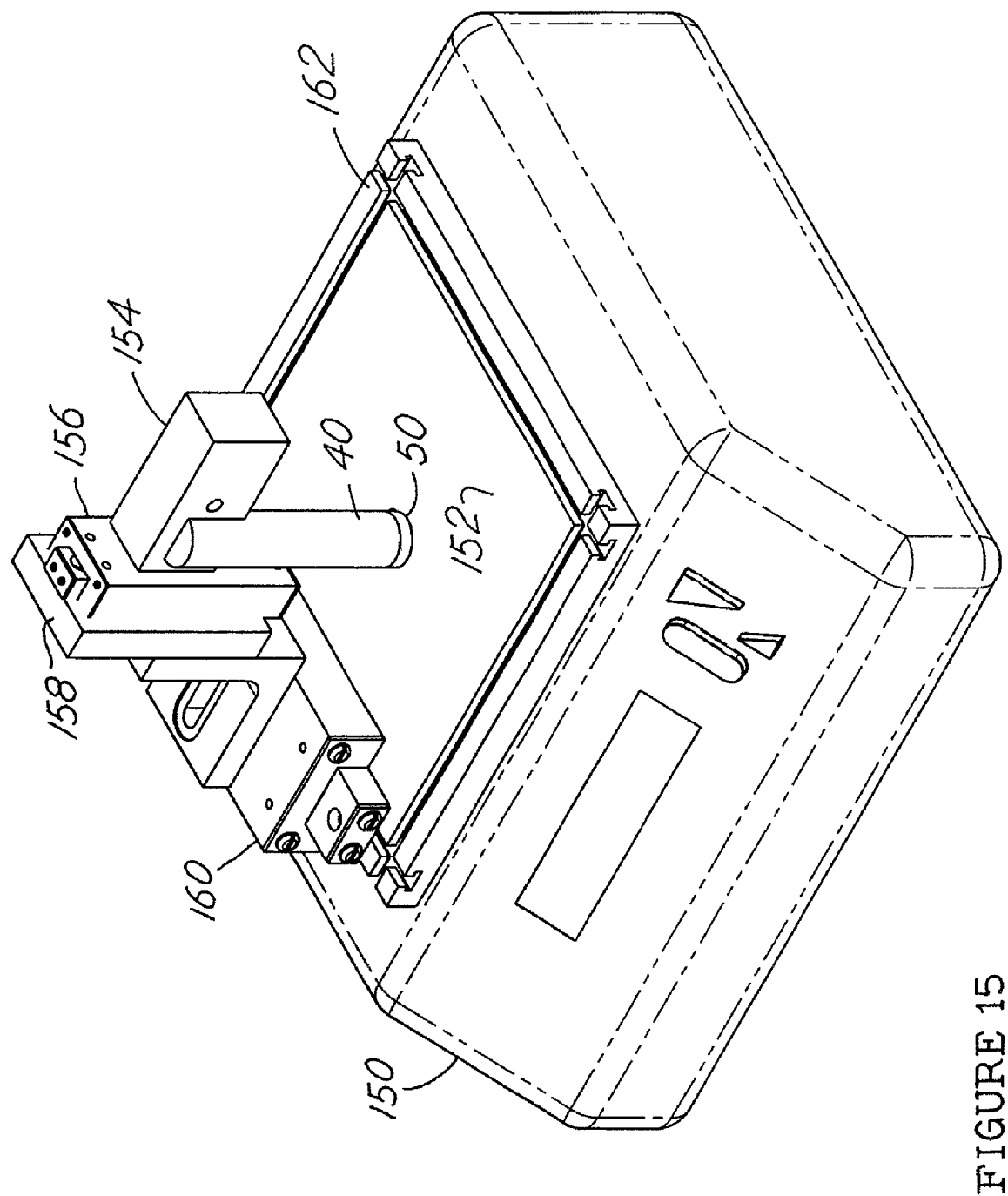
FIG. 15 is an isometric view of a gloss measurement apparatus which comprises an embodiment of the invention.
Figure 16:
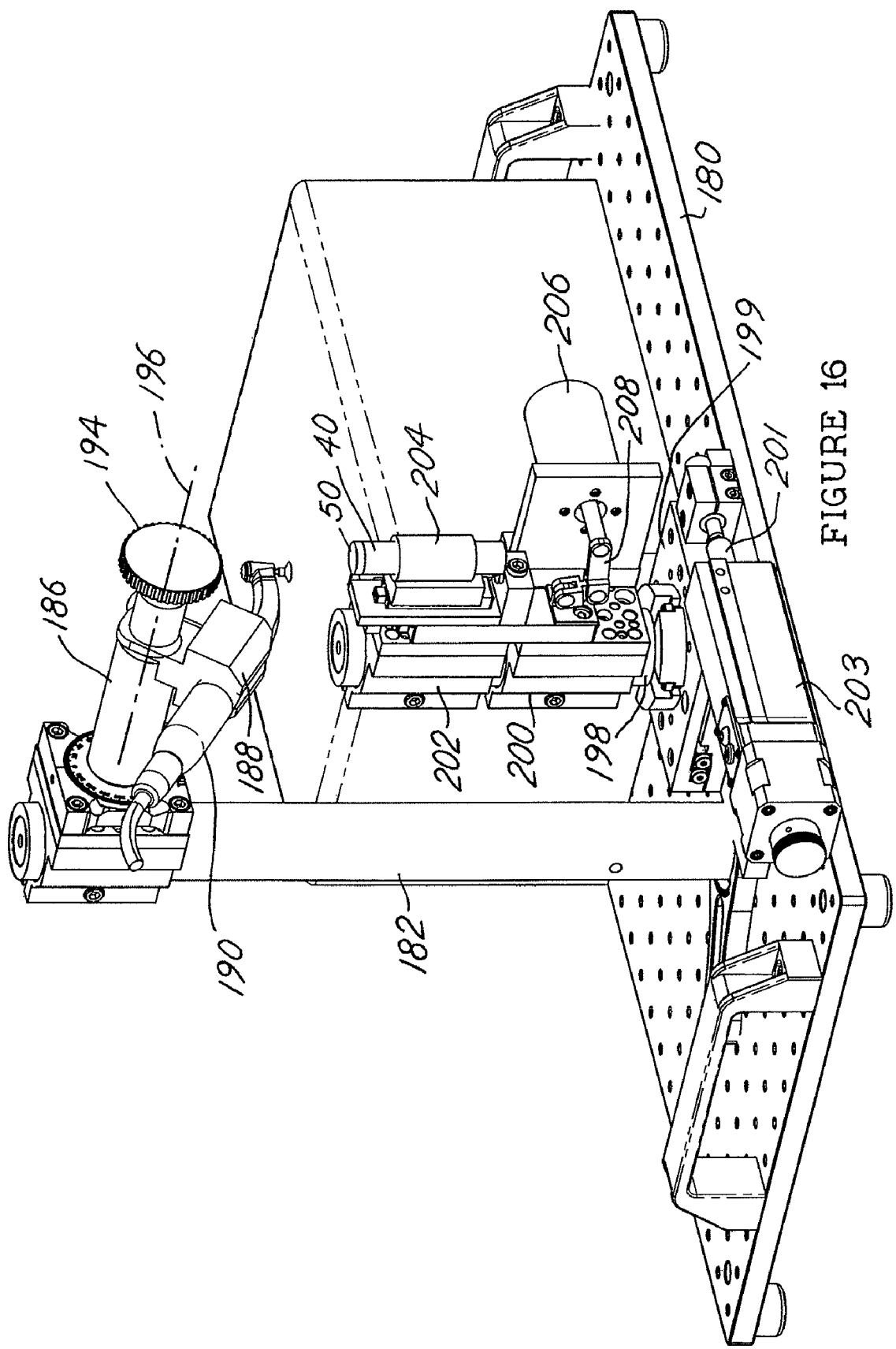
FIG. 16 is a perspective view of a polishing device testing apparatus embodiment of the invention.
Figure 17:
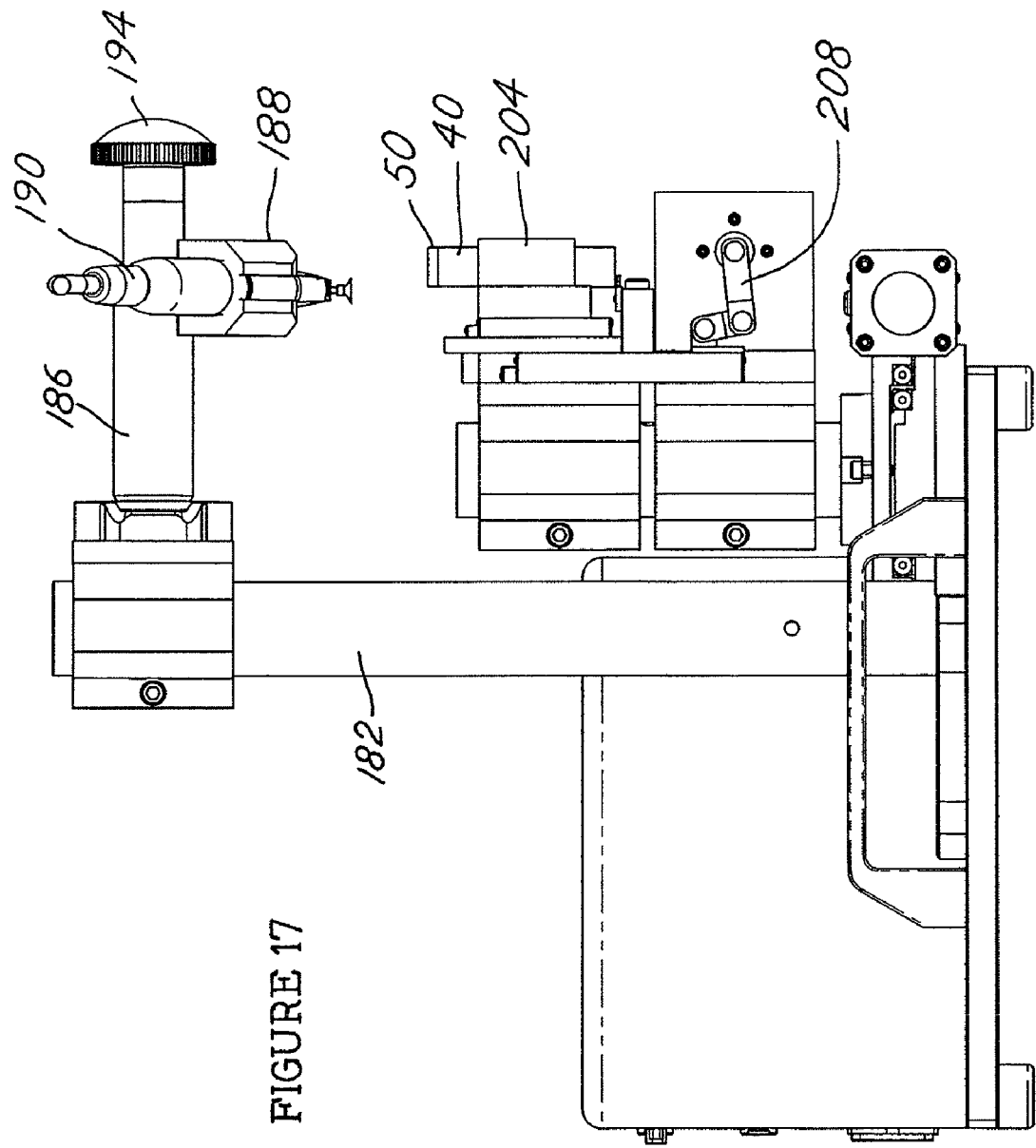
FIG. 17 is a first side elevation of the apparatus of FIG. 16.
Figure 18:
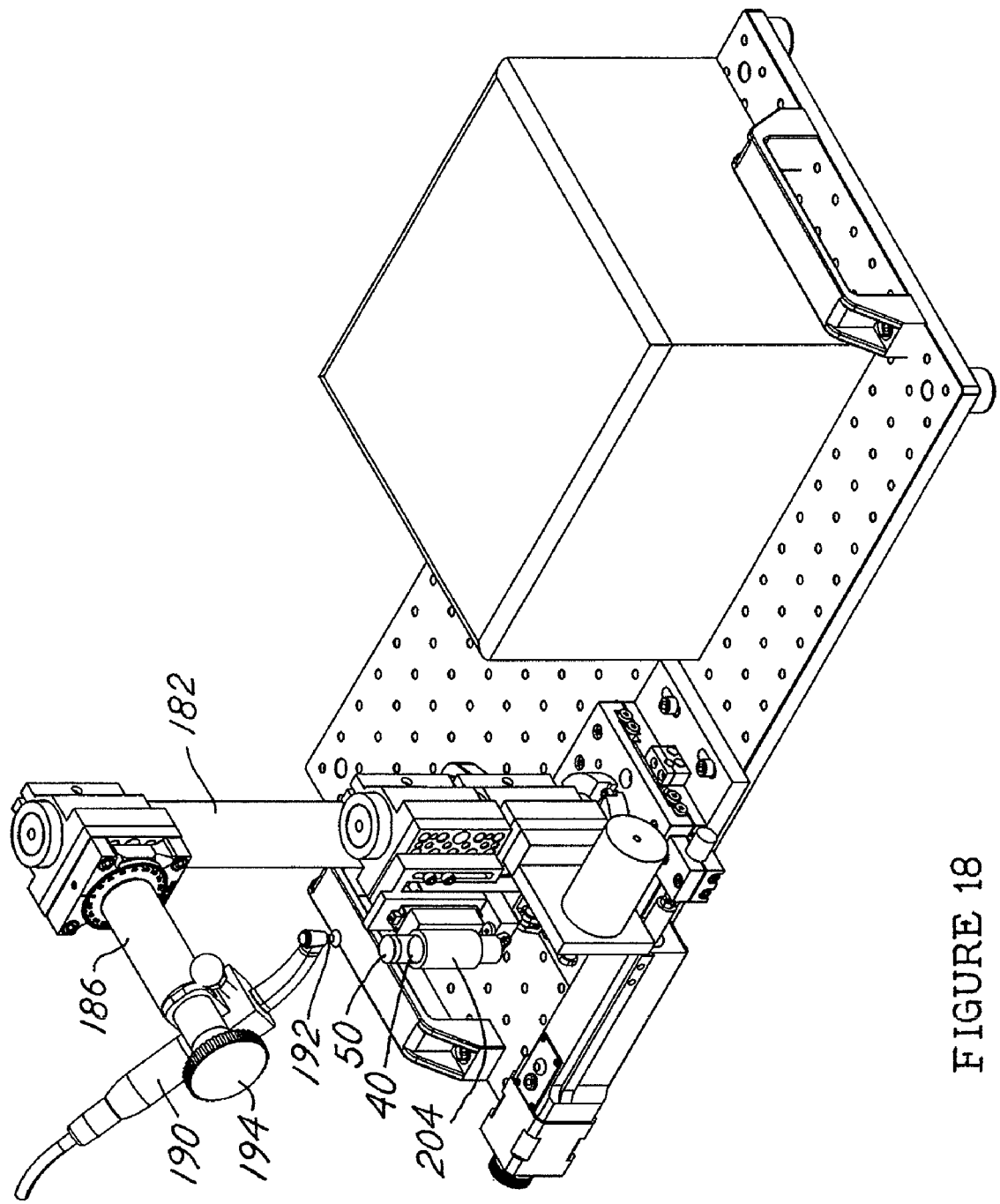
FIG. 18 is a further isometric view of the apparatus of FIG. 16.
Figure 19:
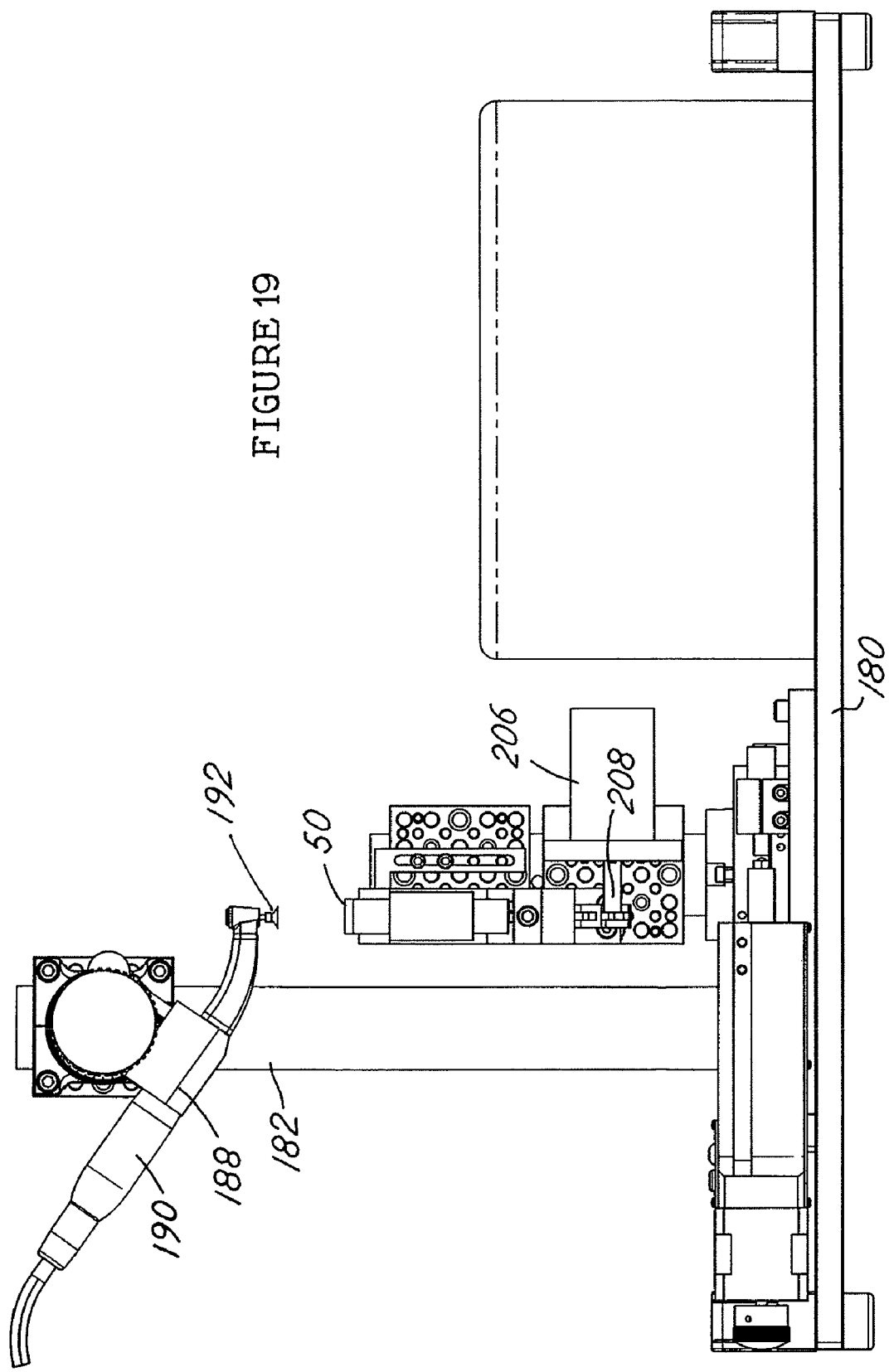
FIG. 19 is a front elevation of the apparatus of FIG. 16.

Another important feature of materials of this nature is the gloss or reflectivity of the material. Apparatus and a protocol enable the measurement of gloss of the specimen which has been placed through the other test stages associated with the practice of the invention. FIG. 15 illustrates a gloss measurement apparatus.

The fifth and final apparatus in the protocol is a polishing device which enables testing of the efficacy of polishing the material using various polishing instruments or devices. Of additional interest, the polishing device testing apparatus may be used not only to test the polishability of specimens, but also to test the instruments that are used for the polishing of the specimen that has been prepared for testing. FIGS. 16-19 of the drawing depict an embodiment of this particular element of the invention.

Figure 22:
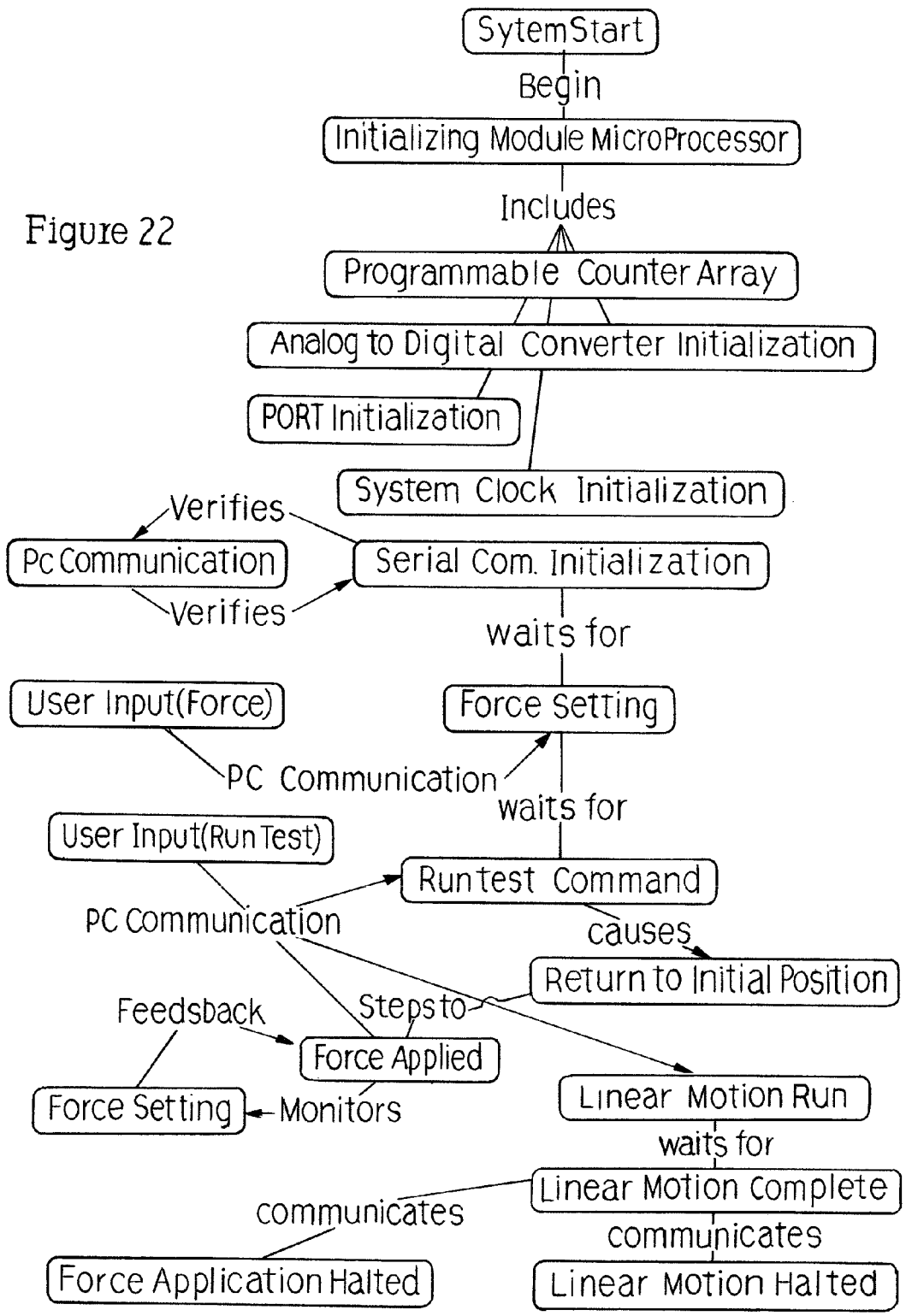
FIG. 22 is a flow chart associated with the polishing device testing apparatus illustrating the sequence of computer operations in control thereof.
Figure 23:
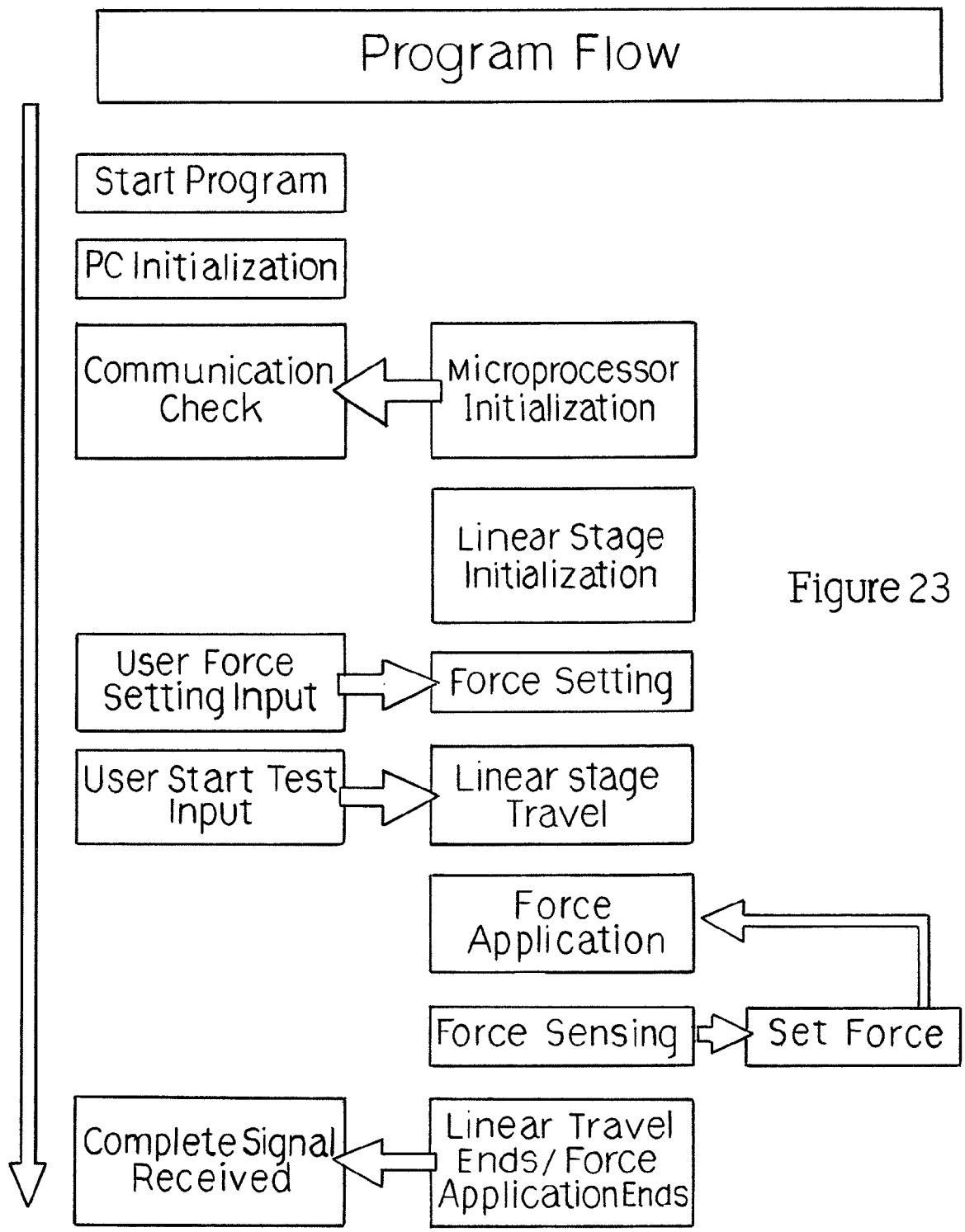
FIG. 23 is a further flow chart depicting a concept map of the polishing device testing apparatus.

Upon characterizing the specific stations or apparatus, the method of use is discussed by way of example. A typical specimen is disclosed in FIGS. 20A and 20B. The overall stages in the testing protocol using the separate devices are depicted in a flow chart as FIG. 21. FIG. 22 illustrates the flow chart associated with the operation of software controlling one of the devices; namely, the polishing device. FIG. 23 illustrates a functional flow chart associated with the polishing device.

Resultant comparative data and information are then illustrated in the charts which comprise FIG. 24. Thus, the following description initially is directed to an explanation of the various stations or devices comprising the physical embodiment of the invention including software associated with those embodiments. This is followed by a specific representative example of the practice of the invention.

Apparatus Stations

1. Initial Surface Finish Preparation Apparatus

Referring to FIGS. 1-4, there is illustrated an embodiment of the surface finish preparation apparatus. The apparatus is designed to hold a disk or cylinder specimen or sample and to polish one side of the surface of that sample. The objective of the apparatus is to provide an initial uniform surface finish which replicates, by way of example, a dental filling or replacement material subsequent to its initial shaping by means of a dental finishing burr or the like. The surface, thus, has a roughness associated with the particular dental tool that has been used to roughly shape the dental filling or the like. The surface is in its initial form upon placement in the dental cavity.

The apparatus includes a support base 10 having a mounting post 12 vertically extending therefrom. The mounting post 12 includes a guide rail 14 affixed along a vertical side thereof. The guide post 14 is affixed to the post 12 by means of attachment brackets 16 and 18. A sample or specimen support assembly 20 is slidably mounted on the post by interaction with the guide rail 14. That is, the assembly 20 includes a housing 22 slidably mounted on guide rail 14 with a rod 24 associated with a cylinder within the housing 22 to provide for slidable adjustment of the housing 22 on the rail 14 inasmuch as the rod 24 bottoms out against a stop 26 mounted at the lower end of the bracket 18. A manually adjustable knob 28 enables rough adjustment of the position of the housing 22 and the mechanisms attached thereto.

A support plate 32 is attached to the housing 22 and moves vertically upwardly and downwardly in response to the movement of the housing 22. A first bracket 34 supports a motor 36 having a drive shaft 38 connected to a sample support 40. The sample support 40 is rotationally positioned within a ring bearing 42 mounted in a block 44 supported by a second or lower bracket 46 attached to the plate 32. The sample support 40 supports a specimen 50 adhered at its distal or lower end. The motor 36 is enabled to rotationally drive the shaft 38. The plate 32 may move upwardly and downwardly in a vertical direction to position the specimen 50 in opposition to a rotational platen 52 which may be rotationally driven either the clockwise or counterclockwise sense on the base 10. The speed of the platen 52 will vary depending upon the material being abraded, typically 5 to 510 rpm. However, the speed may be adjusted in any manner desired in order to test the particular material under investigation.

The platen 52 is typically covered with a removable disk of a graded grit covered material. For example, a carbide based grit may be utilized on the disk. Specimen 50 is positioned so that it will engage the surface of platen 52 and, more particularly, the grit material on the surface of the platen 52 in a normal or perpendicular manner. However, the specimen 50 may be adjusted in an angular fashion to provide for engagement in a non-normal manner. The specimen 50 is rotated about its cylindrical axis in either a clockwise or counter-clockwise direction by virtue of the operation of the motor 36. The housing 22 may be raised and lowered to thereby raise and lower the plate 32 vertically to control the engagement of the specimen 50 with the surface of the platen 52. The speed and force of engagement and other characteristics associated with the initial surface finish preparation protocol may be controlled through appropriate software which controls the vertical position of the specimen 50 as well as the rotational speed and direction of the specimen 50 and/or the platen 52.

2. Surface Roughness Measurement Apparatus

Subsequent to preparation of the specimen 50 utilizing the aforedescribed surface preparation finish apparatus, it is appropriate to measure and record the roughness of the test specimen 50 as initial reference data with respect to the surface treatment protocol. It is then used subsequently to collect surface roughness measurements after the material has been modified. These surface measurements are repeated as necessary. Thus, the surface roughness measurements are made on the sample after preparation by the initial surface roughness preparation apparatus to get a baseline reading on the control region and the region that will be tested. At this point, they will (or should) be essentially the same. Then the specimen is polished and the roughness on the control and polished (test) regions are measured again. The control readings should be the same. If not, then something is wrong (e.g., misalignment in the holder, etc.). This is a major attribute of the device. If there is something wrong with the measurements, it will become clear from the control readings, whether it be surface roughness, height, or gloss. This then serves as verification that the test region readings are actually from the tool being used on the specimen and not the act of making the measurements. FIGS. 7-10 illustrate apparatus for providing an initial profile of the surface of the test specimen. Specifically, a support base 60 includes a profilometer 62 which is mounted on an adjustable platform 63. The platform 63 is further mounted on a base 64 which, in turn, is mounted on a horizontal positioning stage 66. Thus, the profilometer 62 may be adjusted upwardly and downwardly in height by rotation of a control knob 68 which adjusts the linkage assembly 70. The horizontal positioning assembly which supports the horizontal platform 64 on the base 60 may be adjusted by turning the control knob 72 to move the assembly thereby adjusting the stage 66 in an X direction or, in other words, toward the test specimen and the assembly associated therewith as described in greater detail hereinafter. Of course, the profilometer 62 includes a shaft 74 and an associated profilometer stylus 76 which also move in the X direction in order for the profilometer 62 to receive input regarding the profile of the test specimen 50.

The stage 66 further includes a motorized Y-axis positioning arrangement comprising a cylinder within a housing 78 which drives a motorized shaft 80 to thereby position the stage 66 in the Y-axis direction.

A vertical support post 82 mounted on the base 60 supports a Z-axis positioning assembly 84. The Z-axis position assembly 84 is slidable in the X direction in a bracket 86 mounted on the post 82. The Z-axis position stage further includes an arm 88 which is moveable in the Z direction. The arm 88 is attached to a slidable plate 90 mounted on a plate or bracket 92 attached to the post 82. The slidable bracket 90 moves upwardly or downwardly in response to a rod 94 associated with a cylinder within the cylinder housing 96 to thereby permit precise adjustment of the arm 88 as the plate 90 is raised or lowered in response to manual or programmatic direction. A further support post 100 supports a test specimen holder, clamp or collet 102 in which the test specimen 50 is mounted on the support 40 positioned and maintained in a substantially fixed position. The holder 102, however, may be rotated with respect to the post 100 by virtue of a rotational clamp mechanism 106. The specimen 50 which was derived from the surface finish preparation apparatus is thus mounted in the holder or clamp 102 and is attached to the same specimen support 40. Thus, the specimen 50 and its support 40, during the testing procedure, are maintained in the same holder throughout the various test operations. Since support 40 remains dimensionally unchanged, all data derived relates to the working of specimen 50.

The profilometer rod 76 includes a stylus at its outer end which is guided over the top, roughened surface of the specimen 50. Data is acquired by the profilometer 62 to provide a baseline of information regarding the surface roughness and character of the surface of the specimen 50 before final polishing. Data may also be acquired once the specimen 50 is polished. Further, data may be acquired for roughened and polished sections of the planar surface of the specimen such as designated in FIG. 20A. Again, the operation of the various motorized elements of the device may be computer controlled for precise measurement and ultimate recording of data.

3. Height Measurement Apparatus

FIGS. 12-14 illustrate the height measurement apparatus. The height measurement apparatus enables a measurement of the amount of material removed from the surface of the specimen 50 retained in the support, holder or mounting member 40 at any stage in the operation of the test procedure. The height measurement apparatus includes a base 120 with a support post 122 mounted on an XY positioning stage. The XY positioning stage includes an X-axis adjustment mechanism 124 and a Y-axis adjustment mechanism 126. A support bracket 128 is affixed to the post and supports an electronic height indicator 130 which includes an output shaft 132 is operated by a linear actuator 134 mounted to the bracket 128. The linear actuator 134 is used to raise and lower the probe of the shaft 132 of the electronic height indicator from and to, respectively, the surface of the specimen 50. A probe 136 extends from the height indicator 130 and impacts upon the surface of the specimen 150. The length of the composite specimen 50 and its support 40 are retained upon the planar surface 138 of the specimen holder assembly 140. The specimen holder assembly 140 includes a rotational platform 142 mounted on a motorized positioning stage 144 supported on the base 120. In this manner the height of the specimen (indicating the amount of material removed) may be determined over the entire surface of the specimen. Positioning of the height probe with the X and Y axis positioning stage enables gross adjustment and the positioning stage assembly 144 enables rotational adjustment. The data secured from the device may then be stored for graphing and computer analysis.

4. Gloss Measurement Apparatus

The gloss measurement apparatus is depicted in FIG. 15. The gloss measurement device employs a gloss meter device 150 with a special support assembly for the test specimen 50 including the specimen pylon support or rod 40. The rod 40 is supported over an aperture 152 of the gloss meter 150 by the positioning assembly which includes a holder 154 for the rod or support 40 mounted on a vertical positioning slide 156 affixed to a bracket 158 mounted on a horizontal positioning slide 160. The assembly is mounted on a plate or platen 162 on the top face of the gloss meter. Standard gloss meter readings may thus be obtained with respect to polished and unpolished and partially polished specimen materials. Again, computer storage of the readout data is enabled.

5. Polishing Device Testing Apparatus

FIGS. 16-19 depict the above-identified apparatus. The apparatus includes a support base 180. A first vertical support post 182 supports a clamp assembly 184 at the top of the post 182. The clamp assembly includes an adjustable instrument support device 186 such as a device to support a dental instrument 190 or other such device used to modify the specimen surface. The instrument support device 186 includes a clamping member 188 which is designed to hold a dental instrument 190. The polishing device 190 includes a polishing burr or pad 192. The angle of attack of the pad 192 may be adjusted rotationally by operation of the knob 194 for the support post 186. Thus, axial adjustment about the axis 196 may be provided for the polishing instrument 190 as well as axial adjustment.

The apparatus further includes a second support post 198 with first and second spaced clamps 200 and 202 which, in turn, support a slidable test specimen holder 204 which is designed to move in a Z or vertical axis direction in response to the operation of a control motor 206 through the linkage 208. The test specimen holder 204 thus holds the test specimen 50 and its mounting rod or support 40. The vertical positioning clamp 184 may then be adjusted downwardly so that the polishing face of the polishing device 192 may be positioned against or over the top surface of the specimen 50. A programmed movement of the test specimen holder may then be utilized to engage the test specimen against the polishing instrument. The post 198 is mounted on a horizontally moveable platform 199 which moves in the Y direction in response to actuation of a shaft or rod 201 responsive to a motorized horizontal positioning cylinder 203. Movement in the Y axial direction may be included by modification of the platform 199 to move in Y or XY directions.

Thus, the specimen 50 may be subjected to engagement by the polishing pad or the like over its surface in the X direction at a controlled load. The instrument 190 may also be adjusted with respect to its angle of inclination. The knob 194 may be adjusted to change the attitude of the instrument 190 and the knob 194 may also be adjusted in order to axially move the instrument 192 along the axis 196. The operation of the motor 206 as well as the horizontal positioning stage 203 may be computer controlled.

Figure 20A:
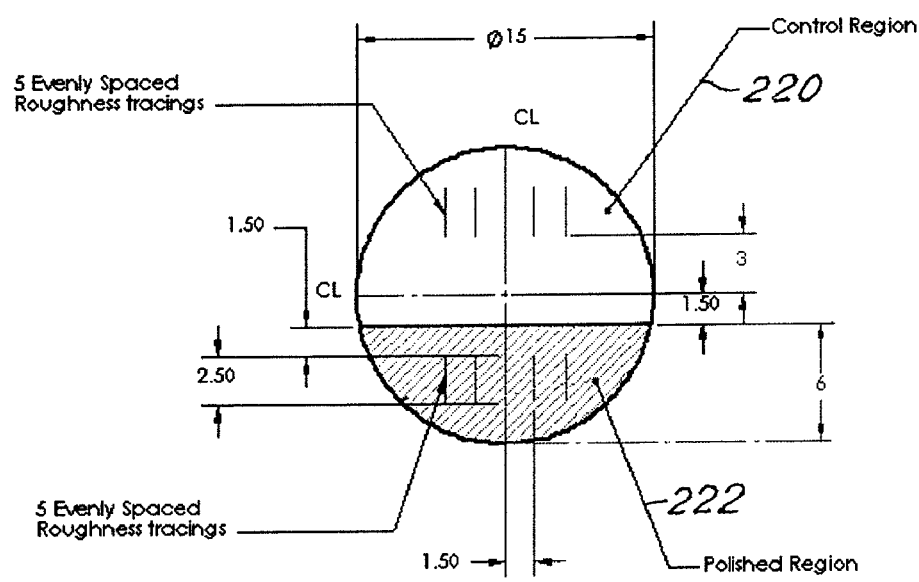
FIG. 20A is a top plan view of a typical specimen disk for testing in accord with the method, system and apparatus of the invention.
Figure 20B:
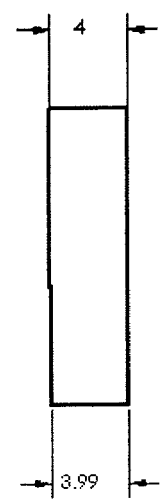
FIG. 20B is a side view of the disk specimen of FIG. 20A.

FIG. 20A illustrates the top surface of a disk 50 which has been subjected to working or measurements by various apparatus when conducting the test protocols described hereinafter. FIG. 20B illustrates the side view of the polished disk. Initially, the roughness of the surface is caused using the surface finish preparation apparatus. The roughness is then quantified by the surface roughness measurement apparatus. Height measurement indicates the amount of material removed by the roughness operation. Gloss may be measured subsequently or prior thereto. Finally, the polishing device is tested using the described machine and the polished region viewed or measured by means of the profilometer or gloss measurement apparatus with the data obtained compared to the control (rough) portion of the specimen that has not been polished.

Referring to FIG. 20A, a control region 220 comprises the region 220 of the surface of the disk 50 which has been conditioned by the initial surface preparation apparatus. The polished region 222 is the region of the surface of the disk initially conditioned by the initial surface preparation apparatus and then further conditioned by the polishing device testing apparatus.

Figure 21:
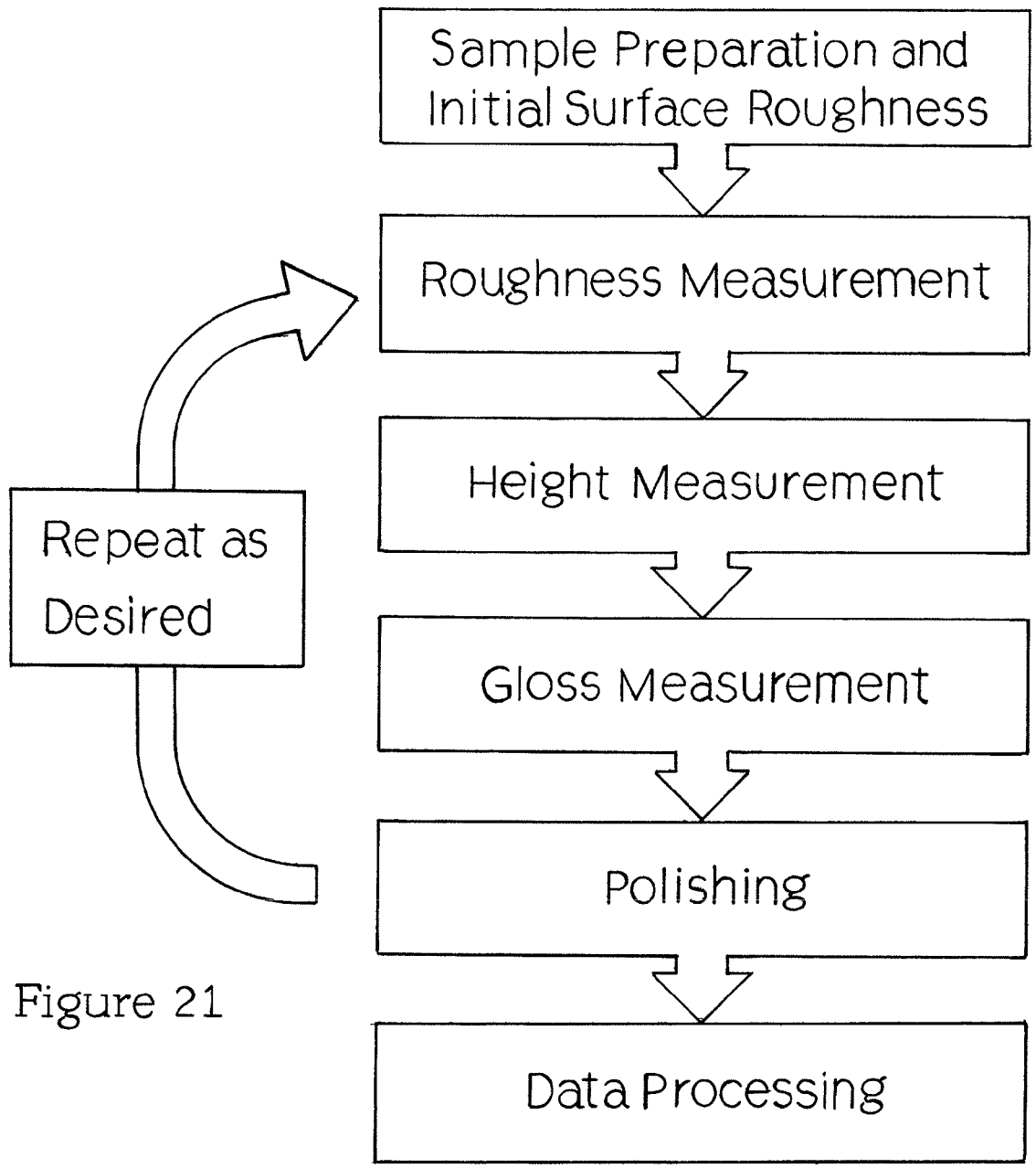
FIG. 21 is a flow chart illustrating the methodology of the practice of the invention and the multiple steps in the conduct of the polishing protocol employed utilizing apparatus disclosed.

FIG. 21 illustrates the steps that would normally be conducted using the apparatus. Initially, a sample 50 is prepared and mounted on a support or rod 40. Initial surface preparation is performed using the initial surface preparation apparatus. Subsequently, roughness, height, and gloss of the specimen surface is established on two regions of the surface, which shall serve as the control and test region. Polishing is then performed on the test region. The roughness, height, and gloss are then measured in the same two regions at the same places on those regions and the resulting data for all measurements is processed. The multiple steps of polishing followed by measurements of roughness, height and gloss in the control and test regions can be repeated as desired.

FIG. 22 is a flow chart showing the multiple steps that may be utilized for control of the polishing apparatus. The system is initially started and initialized. Importantly, a subsequent step is timing of the events. The force of the polishing instrument against the specimen surface is programmed and an initial test run is then caused to occur. During initial test run, the time is controlled, the force is controlled and the linear motion in the X direction is controlled. All the data is gathered for recordal and graphing. FIG. 23 is a simplified flow chart associated with the operation of the polishing testing device. It represents a flow of the various steps associated with FIG. 22.

Example of Test Protocol

In the description, reference may be made to various publications which include specifications for materials such as dental materials as well as additional background information and testing protocols associated with the testing of dental materials. The description of embodiments of the invention thus focuses upon dental materials inasmuch as such materials are subject to quality control standards and consequently, measurements associated with those standards utilizing techniques and apparatus of the present invention that enable the creation of a higher degree of confidence in the assessment of such materials. By way of example and not limitation, the following reference documents are cited:

ANSI/ADA Specification 27, "Resin-Based Filling Materials," July 2005.

ISO/DIS 4049 "Dentistry—Polymer-based filling, restorative and luting materials," 2008-02-28.

ISO 10650 "Dentistry—Powered Polymerization Activators".

C. S. Jones, R. W. Billington, and G. J. Pearson, "Laboratory study of the loads, speeds and times to finish and polish direct restorative materials," *Journal of Oral Rehabilitation*, 2005 32: 686-692.

C. S. Jones, R. W. Billington, and G. J. Pearson, "The in vivo perception of roughness of restorations," *British Dental Journal*, 2004 196: 42-45.

Juliana Da Costa, Jack Ferracane, Rade Paravina, Rui Fernando Mazur, and Leslie Roeder, "The Effect of Different Polishing Systems on Surface Roughness and Gloss of Various Resin Composites," *Journal of Esthetic Restorative Dentistry*, 2007 19: 214-226.

Tamayo Watanabe, Masashi Miyazaki, and B. Keith Moore, "Influence of polishing instruments on the surface texture of resin composites," *Quintessence International*, January 2006 37 Number 1: 61-67.

ASTM D 523—89, "Standard Test Method for Specular Gloss." Annual *Book of ASTM Standards*, Volume 6.01, "Paint—Tests for Chemical, Physical, and Optical Properties; Appearance".

ASTM D 3980, "Practice for Interlaboratory Testing of Paint and Related Materials." Annual *Book of ASTM Stan-*

*dards*, Volume 6.01, "Paint—Tests for Chemical, Physical, and Optical Properties; Appearance".

Quirynen M., Bollen C. M., Papaioannou W., et al., "The influence of titanium abutment surface roughness on plaque accumulation and gingivitis: short-term observations," Int. J. Oral Maxillofac Implants 1996; 11:169-78.

In addition various national standards such as ANSI standards apply to the materials of the nature considered to be candidates for assessment using the apparatus and methods of the present invention. Again by way of example, the following standards can be augmented and proved and verified using the system and methods of the present invention.

General Requirements

Two dental composite materials shall be used along with a dental polishing instrument in this study. Heliomolar (agglomerated microfill composite, Ivoclar Vivadent, Inc.) and Esthet-X HD (hybrid, mini-fill, Dentsply Caulk, Inc.) are used in this example study along with the PDQ2 polishing instrument (Item# P3138, Axis Dental, Inc.). However, any dental composite material and polishing instrument combination can be used with the described system.

For the tests in this protocol where water is referenced, deionized water shall be used in all instances.

Materials

Teflon molds, for the preparation of cylindrical specimens, 4 mm thick×15 mm in diameter. Note that the molds shall be vented such that when pressure is applied to the molds excess material can flow out the vents.

Two metal plates, of sufficient area to cover one side of the mold.

White filter paper.

Glass microscope slides for use during polymerization.

Film, transparent to the activating radiation, e.g., polyester, 50±30 µm thick.

External Energy Source. In this study, the Optilux 501 (Kerr Corporation) dental curing unit, with a 13 mm tip, shall be used as the external energy source. In general, the measured irradiance of the external energy source shall be above 300 mW/cm$^2$ as measured according to ISO 10650 "Dentistry—Powered Polymerization Activators."

Hydraulic press.

Garolite, grade G-10, 15 mm in diameter, to be used to mount the composite material in the various apparatuses of the system.

Cyanoacrylate glue (e.g., Loctite 414, Loctite, Corp.) and primer (e.g., Loctite 7471 Primer, Loctite, Corp.), to be used to secure the dental composite material to the Garolite mounting material.

Initial Surface Finish Preparation Apparatus

Surface roughness measurement apparatus, (e.g., Surtronic 3+, Taylor Hobson, Inc.). In this study, the settings for the surface profilometer were the following: 2.5 mm traverse length, cut-off value of 0.25 mm, and traverse speed of 1 mm/s.

Height measurement apparatus. In this study, the electronic height indicator (e.g., Mitutoyo 543 electronic indicator) was accurate to 0.001 mm.

Gloss measurement apparatus, (e.g., Novo-Curve Glossmeter, Rhopoint Instrumentation LTD, East Sussex, UK). In this study, the glossmeter had a 60° geometry.

Polishing Device Testing Apparatus

Procedure

Preparation of Test Specimens a. Test samples shall be prepared at laboratory temperature and humidity (approx. 23° C. and 50% humidity).

b. Cover one of the metal plates with the filter paper, followed by the polyester film, and position the Teflon mold upon it.

c. Prepare the material in accordance with the manufacturer's instructions and fill the mold to a slight excess with the material (place the material as evenly as possible taking care to exclude air bubbles or voids).

d. Place a second piece of polyester film onto the material in the mold and cover this with the second metal plate. Apply 4000 psi of pressure using a hydraulic press for 1 minute to displace any excess material (note that the molds shall be vented such that when pressure is applied to the molds excess material can flow out the vents).

e. Replace the top metal plate with a glass slide (keep the polyester film in place) and place the exit window of the external energy source against the glass slide and irradiate that section of the specimen for the recommended exposure time.

f. Move the exit window of the external energy source to the section next to the previous one, overlapping the previous section by half the diameter of the exit window, and irradiate for the appropriate time. Continue this procedure until the entire specimen has been irradiated for the recommended exposure time.

g. Replace the glass slide with the metal plate, turn the mold over, and replace the bottom metal plate with a glass slide (keep the polyester film in place) and place the exit window of the external energy source against the glass slide and repeat the irradiation procedure on the bottom side of the specimen.

h. After the irradiation procedure is complete, remove the specimen from the mold and use a drop of cyanoacrylate glue to attach the specimen to a 15 mm diameter Garolite rod. Note that the face of the Garolite rod shall be machined flat such that the deviation across the face is less than ±0.01 mm. Furthermore, the face of the Garolite rod shall be sprayed with primer before the cyanoacrylate glue is dropped on the surface. Also, one region of the Garolite rod shall be ground flat lengthwise to provide a reference point for mounting of the specimen in the polishing, surface roughness, height measuring, and gloss measuring apparatuses.

i. After the specimen is attached to the Garolite rod, store it in deionized water in the water bath at 37±1° C. for 15 minutes.

j. Repeat the procedure for the desired amount of specimens.

Initial Surface Preparation a. After a test specimen has been prepared according to the procedure above, mount the specimen in the initial surface finish preparation apparatus (FIGS. 1-6) by securing the Garolite rod in the motorized chucking device.

b. Once the specimen is properly mounted in the initial surface finish preparation apparatus, the specimen shall be lowered such that it comes in contact with the abrasive paper (e.g., for this study, 120 grit silicon carbide paper) mounted to the turntable of the apparatus. This shall be the initial position of the test specimen.

c. The turntable shall then be set to the desired rpm (e.g., for this study 200 rpm) and turned on.

d. The motor of the motorized chucking device shall be set to the desired speed and rotation and turned on. The motor shall be set such that the rotation of the specimen is counter to the rotation of the turntable with the abrasive paper.

e. Using the linear, motorized translation stage, the rotating specimen shall be lowered into the abrasive paper to a programmed distance (e.g., in this study, a distance of 0.10 mm for the Heliomolar material and 0.15 mm for the Esthet-X HD materials) at a programmed rate.

f. Once the total programmed distance is reached, the translation stage shall raise the specimen to the initial position at the start of the procedure.

g. The motor of the motorized chucking device shall then be reversed such that the rotation of the specimen is in the same direction as the turntable with the abrasive paper. The speed of the motor shall be set to the same speed as the previous step.

h. Using the linear, motorized translation stage, the rotating specimen shall then again be lowered into the abrasive paper to a programmed distance at a programmed rate and held for a programmed time.

i. Once the programmed time is reached, the translation stage shall raise the specimen such that it no longer contacts the abrasive paper and the apparatus shall be turned off.

j. The specimen shall be removed from the apparatus and dried. The average Ra value shall then be obtained using the surface roughness apparatus and the procedure set forth in the "Measurement of surface roughness" section below. The average Ra value of the surface of the specimen shall be verified to the desired Ra±0.1 µm. If the average Ra value is not within this window, the specimen shall be remounted in the initial surface finish preparation apparatus and the procedure repeated until the desired starting value is obtained.

Surface Roughness Measurement a. Mount the specimen in the surface roughness measurement apparatus (FIGS. 7-11). The specimen shall be mounted such that the flat region of the Garolite rod is lined-up against the flat region of the mounting holder of the apparatus. This allows an individual specimen to be mounted in the same starting position each time it is placed in the apparatus. Furthermore, mounting the specimen in this position aligns the flat region of the Garolite rod perpendicular to the path of the profilometer stylus. This position shall be considered the reference position (0° position) and all subsequent roughness measurements shall be made with respect to this position.

b. Once the specimen is properly mounted, a two-axis motorized stage shall be used to position the stylus of the profilometer over the desired positions of the specimen. For the purpose of surface roughness measurements, the specimen shall be divided into two halves (see FIG. 20A). The top half shall be the test region and the bottom half the control region, with the top half being nearest to the profilometer (FIGS. 7-11). Five readings shall be taken on the control region, and five readings shall be taken on the test region of the specimen. An additional single-axis motorized stage mounted vertical to the two-axis stage shall be used to lower the stylus onto the specimen to take measurements and lift it back off again after the roughness measurements are performed, such that no manual manipulation of the device is required and no marring of the surface of the sample occurs during positioning with the two axis stage. Thus, after proper mounting of the specimen in the surface roughness measurement device, the computer program shall be initiated and the single-axis motorized stages shall lower the profilometer stylus onto the specimen. The two-axis motorized stage shall then automatically move the profilometer stylus across the specimen and a roughness reading shall be recorded to the computer. The single-axis motorized stage shall then automatically lift the stylus off of the specimen, and the two-axis stage will move it into the next measurement position. The computer program will repeat this process until five measurements are performed and recorded for both the control and test regions. The measurements shall be taken 3 mm from the centerline dividing the control and test regions of the specimen, and each group of five measurements shall be equally spaced 1.5 mm apart (FIG. 20A).

Height Measurement a. Mount the specimen in the height measurement apparatus (FIGS. 12-15). The specimen shall be mounted such that the flat region of the Garolite rod is lined-up against the flat region of the mounting holder of the apparatus. This allows the specimen to be mounted in the same starting position each time and shall be considered to be the reference position (0 degree position) for all subsequent measurements.

b. Zero the electronic height indicator and start the computer program. The program shall move the motorized rotation stage in 60 degree increments along the circumference of the specimen (1 mm in from the perimeter of the sample). At each 60 degree increment, the computer program shall automatically record the reading from the electronic height indicator to an accuracy of 0.001 mm.

Gloss Measurement a. Mount the specimen in the gloss measurement apparatus (FIG. 15). The specimen shall be mounted such that the flat region of the Garolite rod is lined-up against the flat region of the mounting holder of the apparatus. This allows an individual specimen to be mounted in the same starting position each time it is placed in the apparatus. The specimen shall be mounted such that the designated control region is centered over the aperture opening of the glossmeter.

b. Once the specimen is properly mounted, it shall be lowered onto the face of the glossmeter, using the vertical slide, such that the center of the control region is centered over the aperture opening of the glossmeter.

c. The glossmeter shall be calibrated according to ASTM D523. Three gloss readings shall be taken on the surface of the control region of the specimen and the mean shall be reported. If the range of the three gloss readings is greater than 2 gloss units, then additional readings shall be taken and the mean shall be calculated after discarding divergent results in accordance with the section on outliers in ASTM D3980.

d. Once the control region readings are completed, the specimen shall be lifted off the face of the glossmeter using the vertical slide, moved into position using the horizontal slide, such that the center of the test region is centered over the aperture opening of the glossmeter, and lowered onto the face of the glossmeter using the vertical slide.

e. Three gloss readings shall be taken on the surface of the test region of the specimen and the mean shall be reported. If the range of the three gloss readings is greater than 2 gloss units, then additional readings shall be taken and the mean shall be calculated after discarding divergent results in accordance with the section on outliers in ASTM D3980.

Polishing of Specimen a. Mount the specimen in the polishing device testing apparatus (FIGS. 16-19). The specimen shall be mounted such that the flat region of the Garolite rod is lined-up against the flat region of the mounting holder of the apparatus. This allows an individual specimen to be mounted in the same starting position each time it is placed in the apparatus.

b. Set the speed of the hand piece. In this study, the speed of the hand piece was set at 17,500 rpm (research by Jones et al. 2005 showed that this is an optimum hand piece speed for polishing composite resins).

c. Using the computer program, set the load to be applied to the specimen surface by the polishing device. The load shall be applied to the specimen by the movement of a vertical slide that is attached to a computer-controlled motor, which can move the specimen into the polishing device until the programmed load is attained. In this study, the load that the specimen contacts the polishing device with was 30 g (research by Jones et al. 2005 showed that 20-30 g is an optimum load for polishing composite resins).

d. Once the specimen contacts the polishing device with the programmed load, the motorized positioning table shall move the specimen the full distance of the diameter of the specimen beneath the polishing device for programmed time period, while the computer-controlled motor maintains the programmed load. In this study, the programmed amount of time was 10 seconds.

e. After the programmed test period is reached, the specimen shall be removed from the polishing device testing apparatus, rinsed with a stream of deionized water for five seconds, and dried with a stream of filtered, compressed air for five seconds. The surface roughness, height, and gloss of the test and control regions of the specimen can then be measured and recorded as set forth above in the respective sections of the protocol. This procedure of polishing the specimen for the programmed time at the programmed load followed by measuring and recording its surface roughness, height, and gloss can be repeated as many times as desired by the operator (see flow chart in FIG. 21). The values obtained for the control region for each of the measurements of roughness, height, and gloss allow for quantification of the precision for the measurements at each step of the process.

Results

In this study, the polishing instrument passed over the test surface of the individual specimen twelve times, with each pass lasting 10 seconds. FIG. 24 shows the surface roughness and gloss measurement results for the PDQ2 polishing instrument used on the two composites in this study. For the surface roughness measurements, each data point represents the average Ra value of five traces of the profilometer. At each step, the data from the test region and from the control region is plotted. For the gloss measurements, each data point represents the average gloss of three readings of the glossmeter. At each step, the data from the test region and from the control region is plotted.

The test protocols exhibited excellent consistency of quantitative data including time dependent data. As a consequence, the repeatability of test results enables one to quantitatively establish product parameters that enable creation of usable standards.

While there have been set forth embodiments of the invention, it is to be understood that the invention is limited only by the following claims and equivalents thereof

The invention claimed is:

1. Apparatus for polishing composite dental material specimen and testing surface conditions of the specimen surface of said composite material comprising:
   (A) a first surface abrading stand said stand including;
      (i) a rotationally mounted platen on said first stand for rotational movement about a first axis, said platen including an abrasion surface;
      (ii) a sample containment device for said specimen mounted on the first stand;
      (iii) said sample containment device including a drive mechanism mounted on the first stand to drive the containment device in a direction generally normal to the first axis wherein said composite material specimen mounted by the sample containment device may be engaged with said abrasive surface, said drive mechanism further including a driver for independently rotating said sample containment device about an axis generally parallel to said first axis;
   (B) a second roughness measurement stand, said second stand including:
      (i) a positioning stage mounted on said second stand by a mounting adjustment mechanism for independent horizontal movement of said positioning stage on said second stand;
      (ii) a generally vertical mounting post on said second stand including a sample containment device clamping device for mounting a sample containment device, said clamping device rotatably attached to said mounting post and vertically adjustably mounted on said mounting post to maintain said specimen in said sample containment device directed vertically upward;
      (iii) a profilometer having a generally horizontally projecting shaft with a profile sensing stylus mounted on said shaft;
      (iv) a mounting platform on said stand for mounting said profilometer, said platform including an adjustment mechanism for moving said stylus over and onto said specimen in said sample containment device;
      (v) a profilometer drive mechanism for moving said stylus to measure the roughness of the surface of said specimen whereby surface roughness data for said specimen is generated regarding the surface profile of said specimen; and
   (C) a third polishing device support stand including:
      (i) a generally vertical dental instrument support post with an upper end section,
      (ii) a vertically adjustable clamp assembly attached to the upper end section for holding a dental instrument with a dental composite modification element in a fixed position;
      (iii) a second support post mounted on said third stand with a horizontally and vertically adjustable clamp for a specimen containment device for positioning said specimen in contact with said dental instrument whereby said dental instrument may be operated to polish the surface of said specimen.

2. The apparatus of claim 1 including a control system to control a load and a duration of engagement of said specimen and said dental instrument.

3. The apparatus of claim 1 further including a material removal measurement device comprising:
   (i) a fourth stand;
   (ii) a specimen support mounted on the fourth stand for supporting said sample containment device containing a said specimen;
   (iii) a support post mounted on the fourth stand;
   (iv) a transducer device mounted on the support post of the fourth stand, and
   (v) a sensor for engaging the specimen surface of said specimen and driving the transducer in response to variations in the height of the specimen surface whereby the amount of material removed from the specimen surface is measured.

4. The apparatus of claim 3 wherein two or more stands selected from the group consisting of said first stand, said second stand, said third stand, and said fourth stand are combined to comprise a single stand.

5. The apparatus of claim 3 wherein said surface roughness data is collected and stored in a storage device and data of the amount of material removed from the specimen surface is collected and stored in a storage device.

6. The apparatus of claim 5 further including a comparator device for comparing collected and stored data.

7. The apparatus of claim 3 including control apparatus for said horizontally and vertically adjustable clamp for said dental instrument to position said specimen in said specimen holder in contact with said dental instrument.

8. The apparatus of claim 3 including a separate sample containment device for at least two of said stands.

9. The apparatus of claim 1 further including a gloss measurement apparatus comprising:
   (i) a gloss measurement device including a gloss measurement sensor; and
   (ii) an adjustable sample containment device clamp and support assembly whereby said specimen may be positioned for readings by said gloss measurement sensor.

10. The apparatus of claim 1 comprising a separate sample containment device for at least two of the said stands.

* * * * *